United States Patent
Muto et al.

(10) Patent No.: US 9,346,485 B2
(45) Date of Patent: May 24, 2016

(54) POWER STEERING APPARATUS AND REDUCTION MECHANISM FOR POWER STEERING

(71) Applicant: HITACHI AUTOMOTIVE SYSTEMS STEERING, LTD., Hiki-gun, Saitama (JP)

(72) Inventors: Satoru Muto, Atsugi (JP); Keisuke Kitamura, Atsugi (JP); Shogo Ishikawa, Atsugi (JP)

(73) Assignee: HITACHI AUTOMOTIVE SYSTEMS STEERING, LTD., Hiki-Gun (JP)

( * ) Notice: Subject to any disclaimer, the term of this patent is extended or adjusted under 35 U.S.C. 154(b) by 126 days.

(21) Appl. No.: 14/148,092

(22) Filed: Jan. 6, 2014

(65) Prior Publication Data

US 2014/0284133 A1    Sep. 25, 2014

(30) Foreign Application Priority Data

Mar. 25, 2013    (JP) ................................. 2013-061663

(51) Int. Cl.
*B62D 5/04*    (2006.01)

(52) U.S. Cl.
CPC ............ *B62D 5/0448* (2013.01); *B62D 5/0442* (2013.01)

(58) Field of Classification Search
CPC .. B62D 5/0442; B62D 5/0445; B62D 5/0448; F16H 25/20

USPC .......................... 180/443, 444, 446; 74/89.23
See application file for complete search history.

(56) References Cited

U.S. PATENT DOCUMENTS

| | | | |
|---|---|---|---|
| 7,100,465 B1 * | 9/2006 | Hollis et al. ................. | 74/89.39 |
| 8,141,445 B2 * | 3/2012 | Yoshioka et al. ............ | 74/89.23 |
| 2004/0061382 A1 * | 4/2004 | Schreier .......................... | 310/13 |
| 2010/0282009 A1 * | 11/2010 | Knudsen et al. ............. | 74/89.37 |
| 2012/0186896 A1 * | 7/2012 | Yamamoto et al. ........... | 180/444 |

FOREIGN PATENT DOCUMENTS

JP    2006-224938 A    8/2006

\* cited by examiner

*Primary Examiner* — Joseph Rocca
*Assistant Examiner* — Marc A Scharich
(74) *Attorney, Agent, or Firm* — Foley & Lardner LLP

(57) ABSTRACT

A fixation member is circularly formed to surround a wheel turning shaft and includes an abutment surface in abutment with an end surface of a bearing on one axial side. The fixation member fixes the bearing to a housing by being fixed in the housing with the abutment surface in abutment with the end surface of the bearing. When being mounted, the fixation member is provided by being moved from an opposite axial end side to one axial end side of the nut. The abutment surface of the fixation member is formed on at least a radially inner side of the fixation member. The fixation member includes a cutout portion provided on the radially inner side of the fixation member and formed to prevent interference with a circulation member when the fixation member is inserted in the housing.

14 Claims, 13 Drawing Sheets

POWER STEERING APPARATUS AND REDUCTION MECHANISM FOR POWER STEERING

BACKGROUND OF INVENTION

The present invention relates to a power steering apparatus and a reduction mechanism for power steering.

Japanese Patent Application Public Disclosure No. 2006-224938 discloses a related technique thereto. Japanese Patent Application Public Disclosure No. 2006-224938 discusses a power steering apparatus including a ball screw mechanism. This power steering apparatus is configured in such a manner that, after reaching one end of a screw groove, balls in the ball screw mechanism return to an opposite end of the screw groove via a circulation passage.

However, the technique discussed in Japanese Patent Application Public Disclosure No. 2006-224938 has such a drawback that the size of a nut increases because the circulation passage is formed within the nut of the ball screw mechanism.

SUMMARY OF INVENTION

The present invention has been conceived in consideration of the drawback, and an object thereof is to provide a power steering apparatus and a reduction mechanism for the power steering apparatus that can realize a size reduction.

According to one aspect of the present invention, a power steering apparatus comprises a wheel turning shaft (rack) configured to turn a wheel to be steered by being moved in the axial direction of the shaft according to a rotation of a steering wheel, a ball screw mechanism configured to cause the wheel turning shaft to move in the axial direction of the wheel turning shaft, and an electric motor configured to provide a rotational force to the wheel turning shaft via the ball screw mechanism. The ball screw mechanism includes a wheel turning shaft-side ball screw groove formed on an outer circumferential side of the wheel turning shaft and shaped into a spiral groove, and a nut disposed to surround the wheel turning shaft and to be rotatable relative to the wheel turning shaft. The nut has a rotational axis. The nut has one end side and an opposite end side in a direction along the rotational axis. The ball screw mechanism further includes a nut-side ball screw groove formed on an inner circumferential side of the nut. The nut-side ball screw groove is shaped into a spiral groove, and defines a ball circulation groove together with the wheel turning shaft-side ball screw groove. The ball screw mechanism further includes a plurality of balls disposed in the ball circulation groove, a circulation member (tube) disposed on an outer side of the nut in a radial direction relative to the rotational axis and configured to connect one end side and an opposite end side of the ball circulation groove so that the plurality of balls can circulate from the one end side to the opposite end side of the ball circulation groove, a housing formed to contain at least the one end side of the nut relative to the circulation member in the direction along the rotational axis, and a bearing disposed on the one end side relative to the circulation member in the direction along the rotational axis between the nut and the housing. The bearing is formed to surround the nut, and rotatably support the nut in the housing. The ball screw mechanism further includes a circular fixation member formed to surround the wheel turning shaft and provided with an abutment surface in abutment with an end surface of the bearing on one side in the direction along the rotational axis. The fixation member is configured to fix the bearing to the housing by being fixed in the housing with the abutment surface in abutment with the end surface of the bearing on the one side in the direction along the rotational axis. The fixation member is provided around the nut by being moved from the opposite end side to the one end side of the nut in the direction along the rotational axis at the time of assembling. The plurality of balls moves in the ball circulation groove according to a rotation of the nut relative to the wheel turning shaft, thereby causing the wheel turning shaft to move relative to the nut in the longitudinal direction of the wheel turning shaft. The electric motor is arranged to provide a rotational force to the nut so that the nut rotates relative to the wheel turning shaft. The abutment surface of the fixation member is formed on at least an inner side of the fixation member in the radial direction. The fixation member includes a cutout portion provided on the inner side of the fixation member in the radial direction, and formed to prevent the fixation member from interfering with the circulation member when the fixation member is inserted in the housing. The cutout portion is formed in such a manner that a distance from the rotational axis of the nut to an inner end of the cutout portion in the radial direction is longer than a distance from the rotational axis of the nut to an inner end of the abutment surface in the radial direction.

DESCRIPTION OF EMBODIMENTS

First Embodiment

A power steering apparatus 1 according to a first embodiment will be described now. The power steering apparatus 1 is configured in such a manner that an assist force is added to a driver's steering force by transmitting a driving force of an electric motor 40 to a wheel turning shaft 10 via a screw mechanism 26.

[Structure of Power Steering Apparatus]

Figure 1:
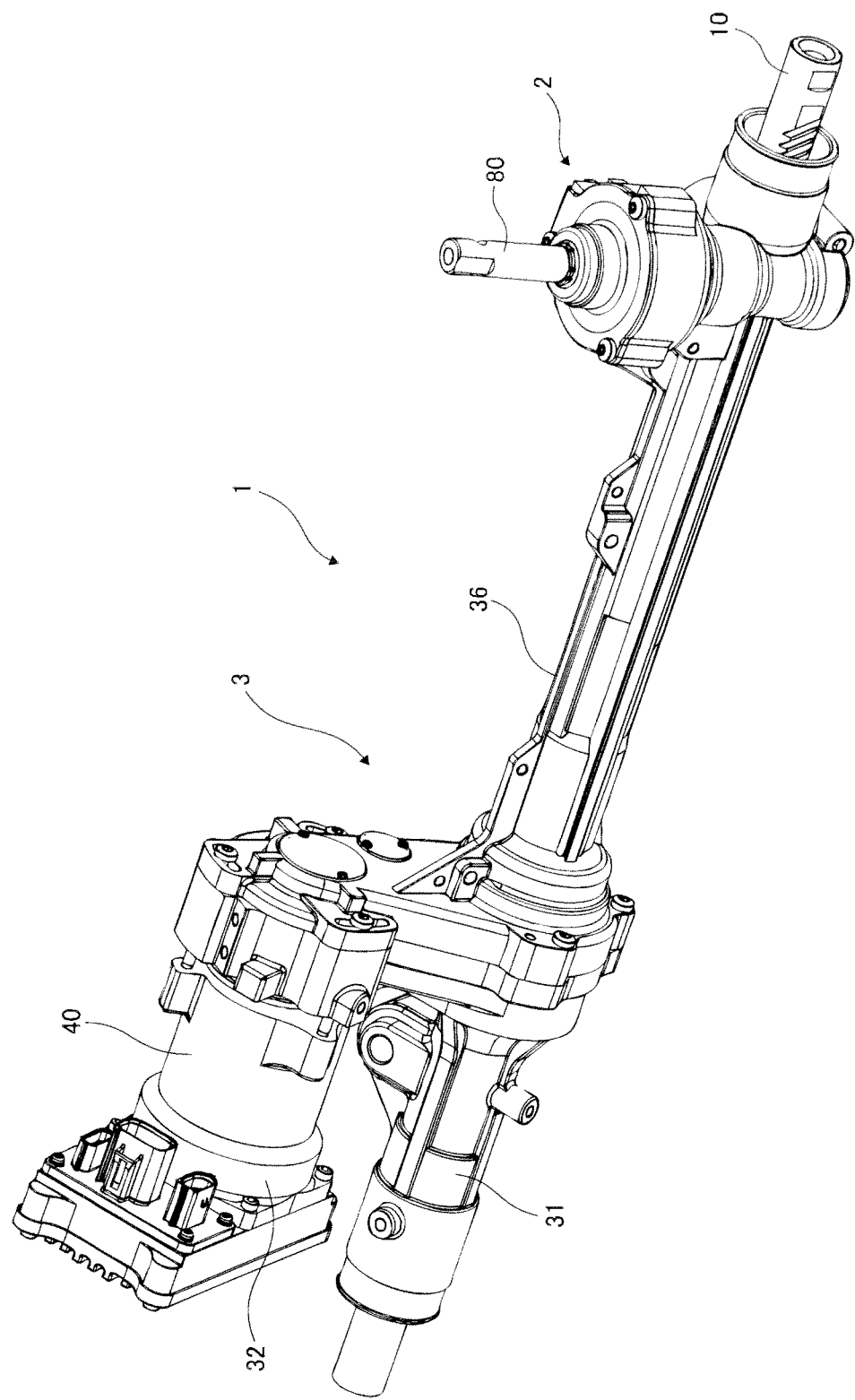
FIG. 1 is a perspective view illustrating a power steering apparatus according to a first embodiment of the present invention.
Figure 2:
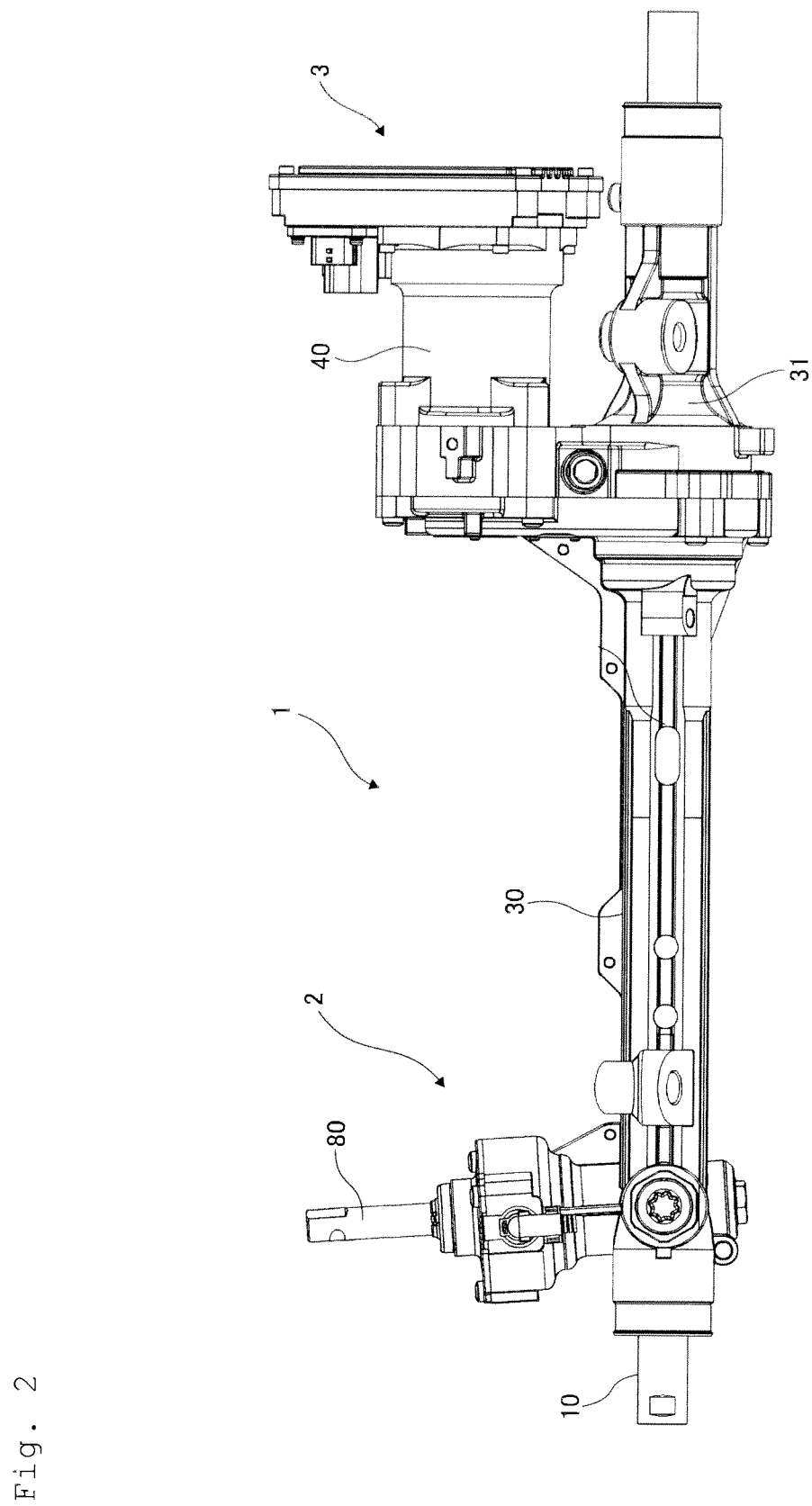
FIG. 2 is a front view of the power steering apparatus according to the first embodiment.
Figure 3:
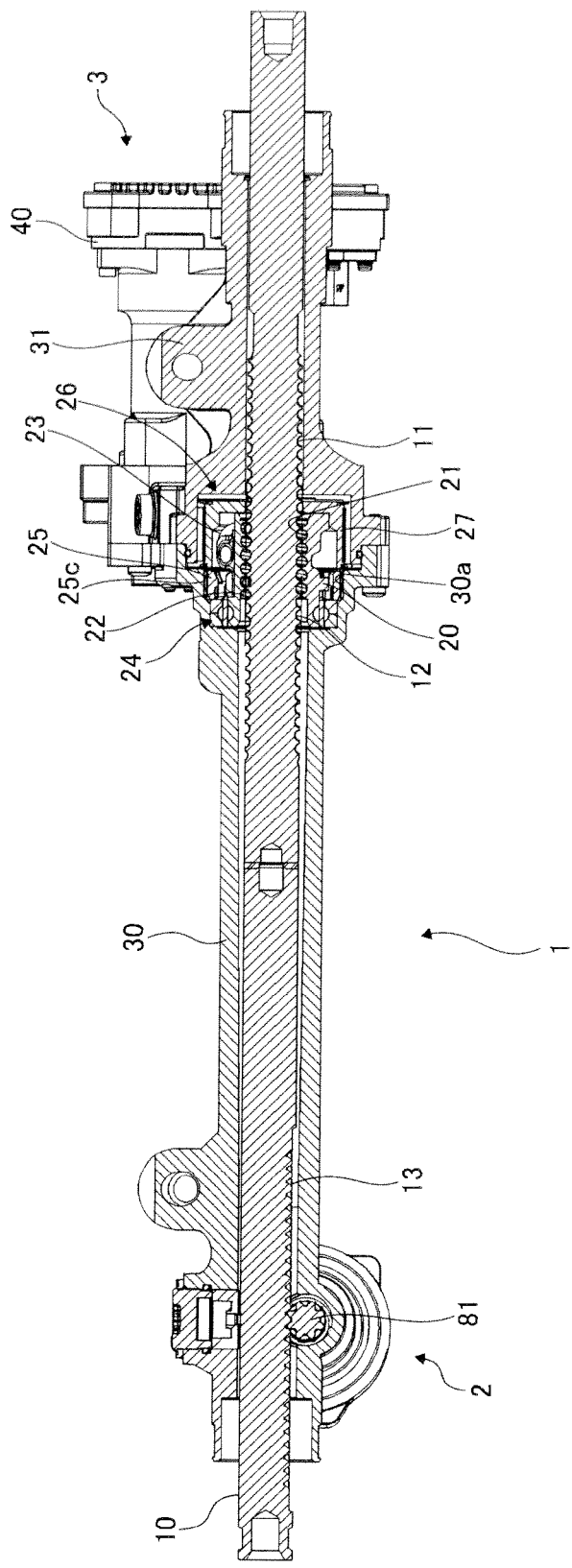
FIG. 3 is an axial cross-sectional view of the power steering apparatus according to the first embodiment.

FIG. 1 is a perspective view of the power steering apparatus 1. FIG. 2 is a front view of the power steering apparatus 1. FIG. 3 is a cross-sectional view of the power steering apparatus 1 taken along the axial direction of the wheel turning shaft 10 of the power steering apparatus 1.

The power steering apparatus 1 includes a steering mechanism 2 that transmits a rotation of a steering wheel operated by a driver to the wheel turning shaft 10 for turning a wheel to be steered, and an assist mechanism 3 that provides an assist force to the wheel turning shaft 10. The steering mechanism 2 includes a steering input shaft 80 coupled to the steering wheel (not illustrated), and a pinion 81 (refer to FIG. 3) that rotates integrally with the steering input shaft 80. The pinion 81 is meshed with a rack 13 formed along an outer circumference of the wheel turning shaft 10.

The respective components of the power steering apparatus 1 are contained in a housing. The housing includes a first housing 30, a second housing 31, and a third housing 32, and is formed by combining them. The first housing 30 mainly contains the steering mechanism 2, a part of the wheel turning shaft 10, and a part of the screw mechanism 26 of the assist mechanism 3. The second housing 31 mainly contains a part of the screw mechanism 26, and a part of the wheel turning shaft 10. The third housing 32 mainly contains the electric motor 40.

The assist mechanism 3 includes the electric motor 40, and the screw mechanism 26 that transmits an output of the electric motor 40 to the wheel turning shaft 10. The output of the electric motor 40 is controlled by a motor controller (not illustrated) according to a steering torque and a steering amount that the driver inputs to the steering wheel.

The screw mechanism 26 includes a nut 20 and a pulley 27. The pulley 27 is fixed to the nut 20 so as to be rotatable integrally with the nut 20. A belt 28 is wound between the pulley 27 and an output shaft of the electric motor 40.

The nut 20 is formed annularly so as to surround the wheel turning shaft 10, and is provided around the wheel turning shaft 10 so as to be rotatable relative to the wheel turning shaft 10. A groove is spirally formed along an inner circumference of the nut 20, and this groove defines a nut-side ball screw groove 21. A groove is spirally formed along the outer circumference of the wheel turning shaft 10 at a position axially spaced apart from a portion where the above-described rack 13 is formed. This groove defines a wheel turning shaft-side ball screw groove 11. A ball circulation groove 12 is defined by the nut-side ball screw groove 21 and the wheel turning shaft-side ball screw groove 11 with the nut 20 provided around the wheel turning shaft 10. A plurality of metallic balls 22 is loaded in the ball circulation groove 12. A rotation of the nut 20 causes movements of the balls 22 in the ball circulation groove 12. As a result, the wheel turning shaft 10 longitudinally moves relative to the nut 20.

[Structure of Nut]

Figure 4:
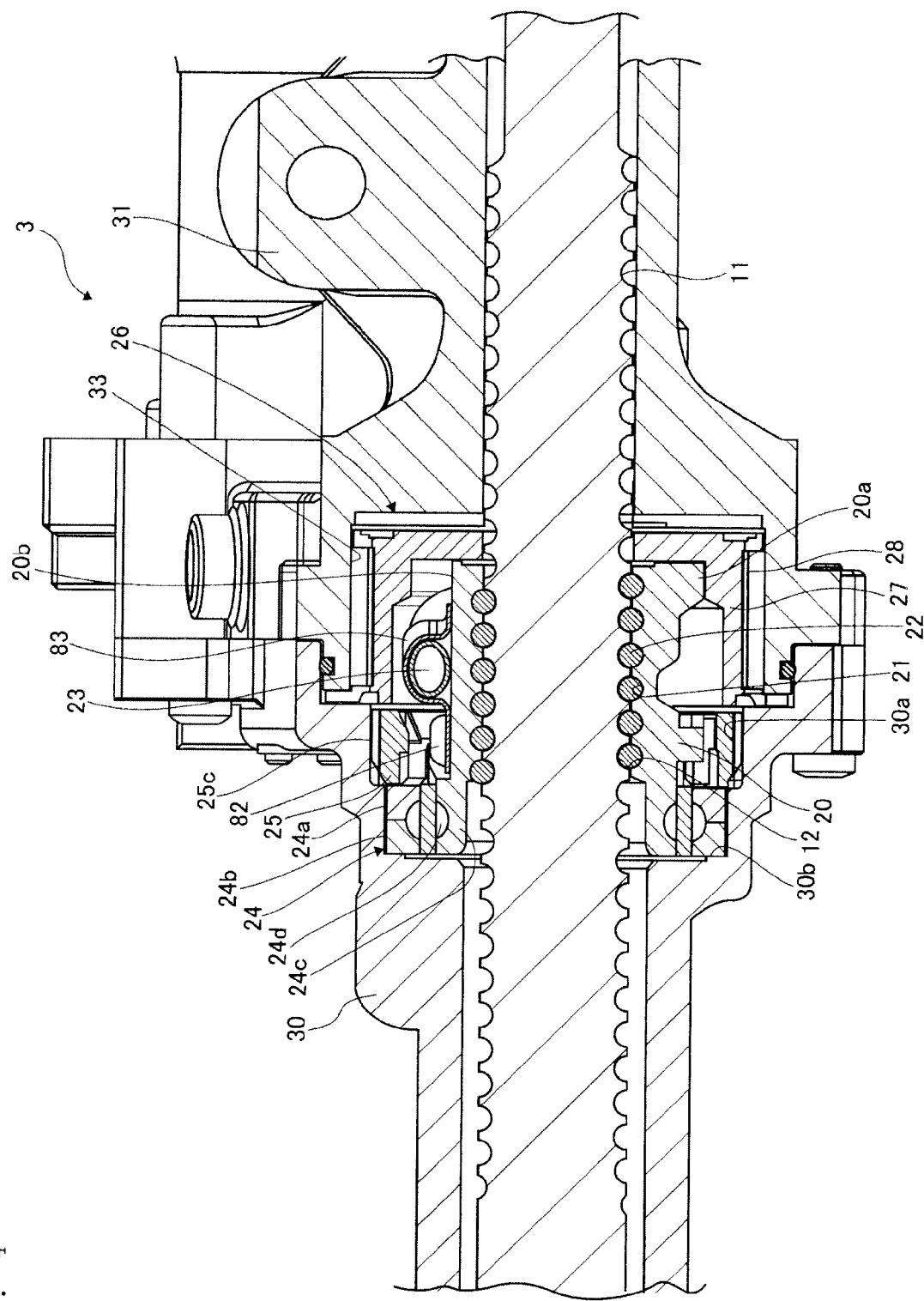
FIG. 4 is an enlarged cross-sectional view illustrating a vicinity of an assist mechanism of the power steering apparatus according to the first embodiment.
Figure 5:
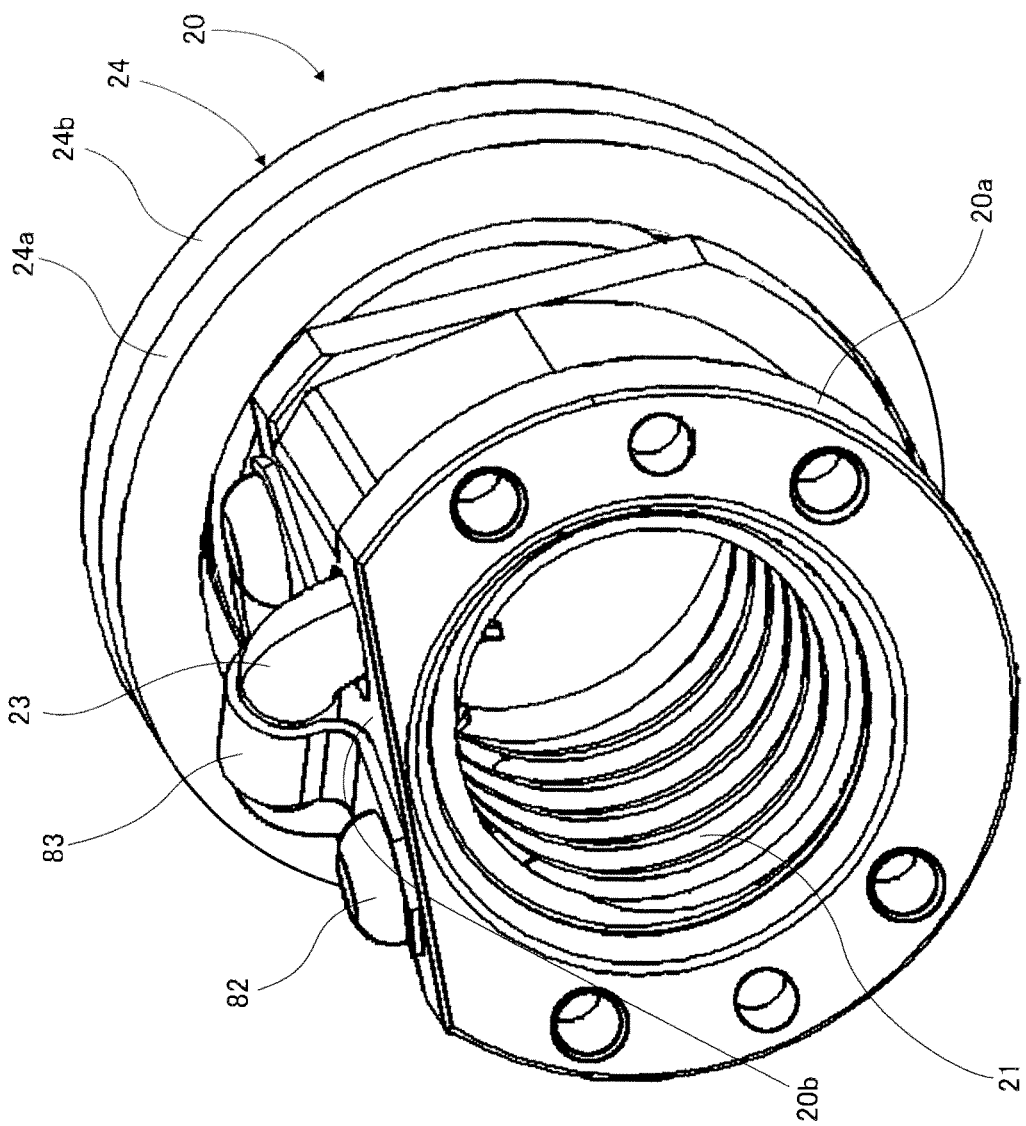
FIG. 5 is a perspective view of a nut in the assist mechanism.
Figure 6:
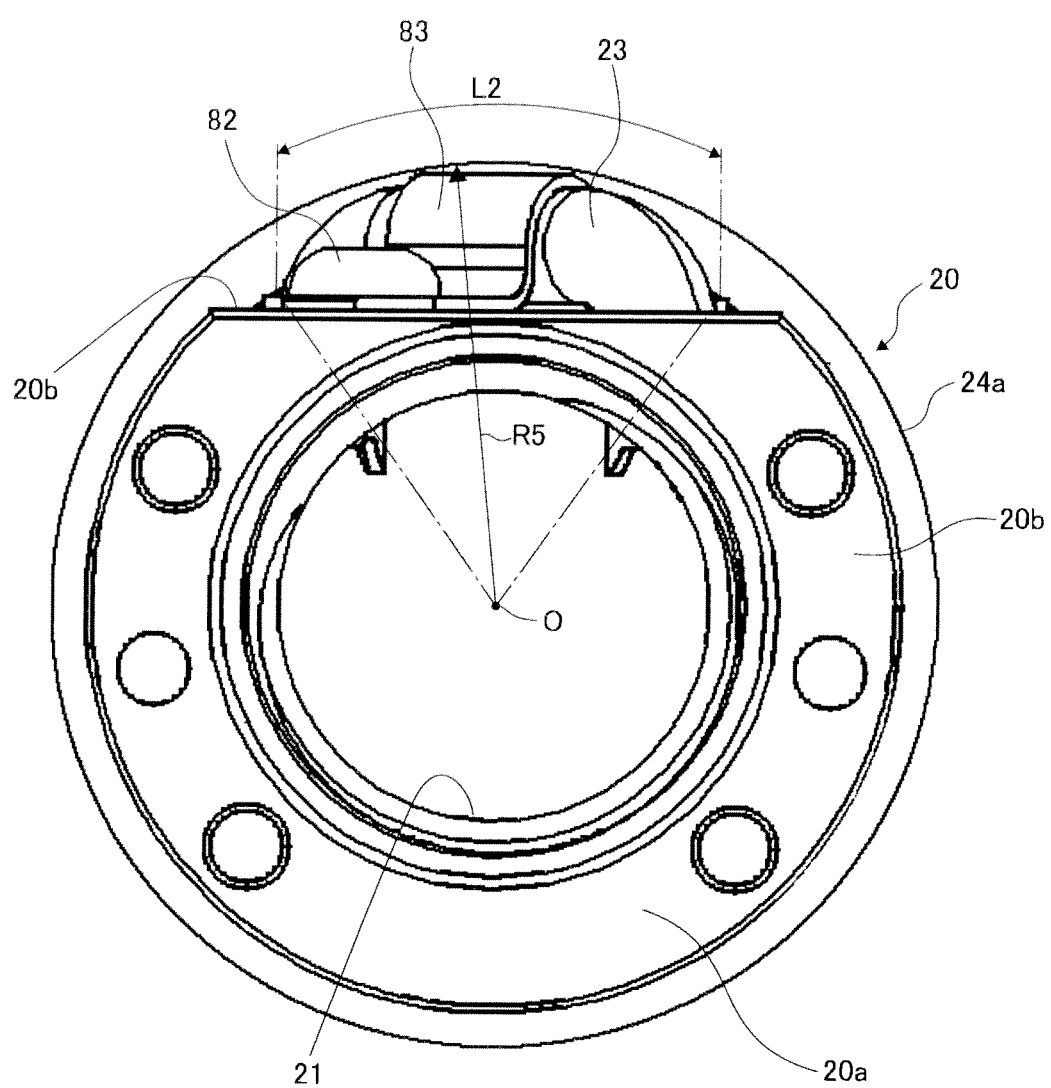
FIG. 6 is a front view of the nut.
Figure 7:
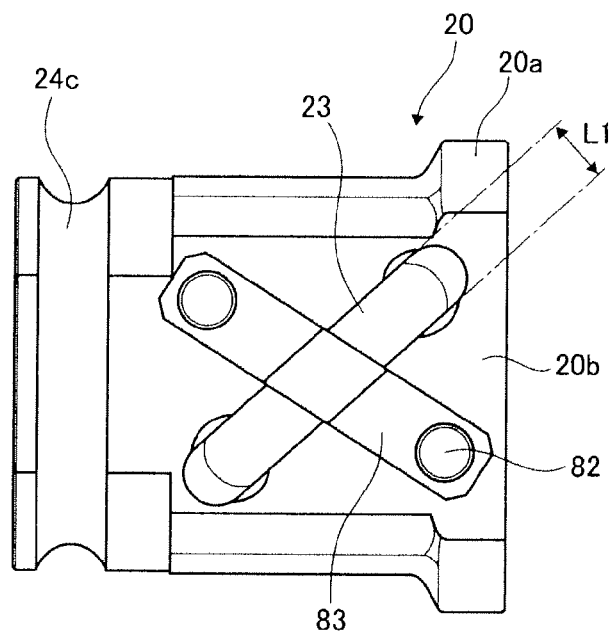
FIG. 7 is a side view of the nut.

FIG. 4 is an enlarged cross-sectional view of a vicinity of the assist mechanism 3 of the power steering apparatus 1. FIG. 5 is a perspective view of the nut 20. FIG. 6 is a front view of the nut 20 as viewed from the axial direction of the nut or the direction along the rotational axis of the nut. FIG. 7 is a side view of the nut 20 as viewed from the radial direction relative to the axial direction.

An inner race 24*c* of a bearing 24 is integrally formed on one axial end side of the nut 20. The bearing 24 is a ball bearing. The bearing 24 includes two divided outer races 24*a* and 24*b*, the inner race 24*c*, and a ball 24*d* provided between the outer races 24*a* and 24*b* and the inner race 24*c*. The bearing 24 rotatably supports the nut 20 so that the nut 20 is rotatable relative to the first housing 30 with the nut 20 mounted in the first housing 30.

The nut 20 has a flange portion 20*a* formed at an opposite axial end side of the nut 20. The pulley 27 is fixed to the flange portion 20*a*.

A circulation member mounting portion 20*b* is formed on an outer periphery or circumference of the nut 20. A part of the substantially cylindrical nut 20 in the circumferential direction except for a portion thereof corresponding to the inner race 24*c* is cut out. Then, this cutout portion is formed as a flat surface. This cutout portion defines the circulation member mounting portion 20*b*.

Communication holes are formed at the circulation member mounting portion 20*b*, and these communication holes are in communication with one end and an opposite end of the nut-side ball screw groove 21, respectively. A tubular circulation member 23 is inserted in the communication holes of the circulation member mounting portion 20*b* so as to connect the two communication holes. The circulation member 23 is a passage for transferring the balls 22 that have reached an end of the ball circulation groove 12 to an opposite end of the ball circulation groove 12, and defines a closed circulation passage. The balls 22 can be circulated through the closed circulation passage. The circulation member 23 is fixed to the nut 20 by a fixation piece 83. The fixation piece 83 is fixed to the nut 20 by screws 82.

The nut 20 is contained in a ball screw mechanism container portion 33 defined at a portion where the first housing 30 and the second housing 31 are joined to each other. The first housing 30 contains a portion of the nut 20 where the bearing 24 is provided, and a part of a portion of the nut 20 where the circulation member 23 is provided in the axial direction of the nut 20. Further, the second housing 31 contains the remaining part of the portion of the nut 20 where the circulation member 23 is provided in the axial direction of the nut 20.

The outer races 24*a* and 24*b* of the bearing 24 are sandwiched by a side surface 30*b* of the first housing 30 and a lock ring 25. The side surface 30*b* of the first housing 30 is a side surface of the ball screw mechanism container portion 33. This arrangement prevents the nut 20 from axially moving relative to the first housing 30.

[Structure of Lock Ring]

Figure 8:
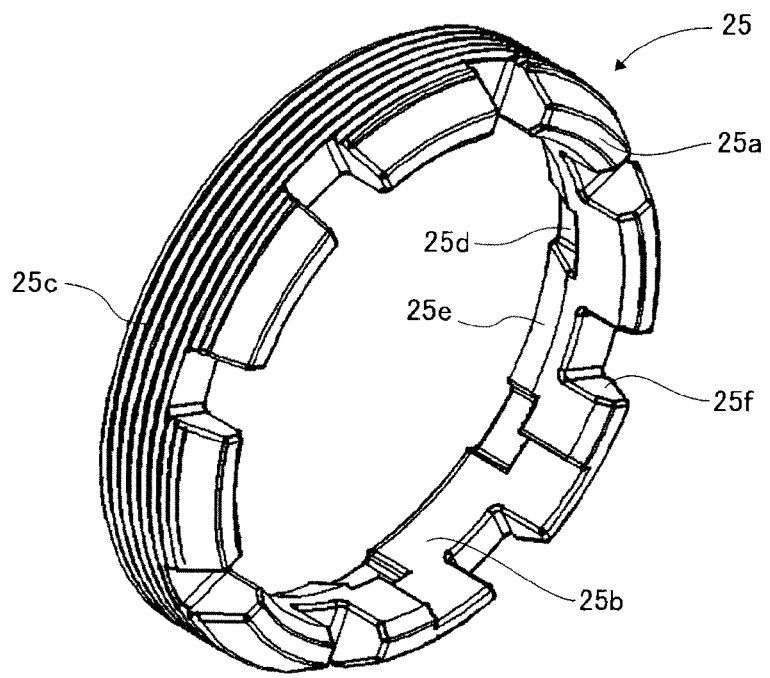
FIG. 8 is a perspective view of a lock ring in the assist mechanism.
Figure 9:
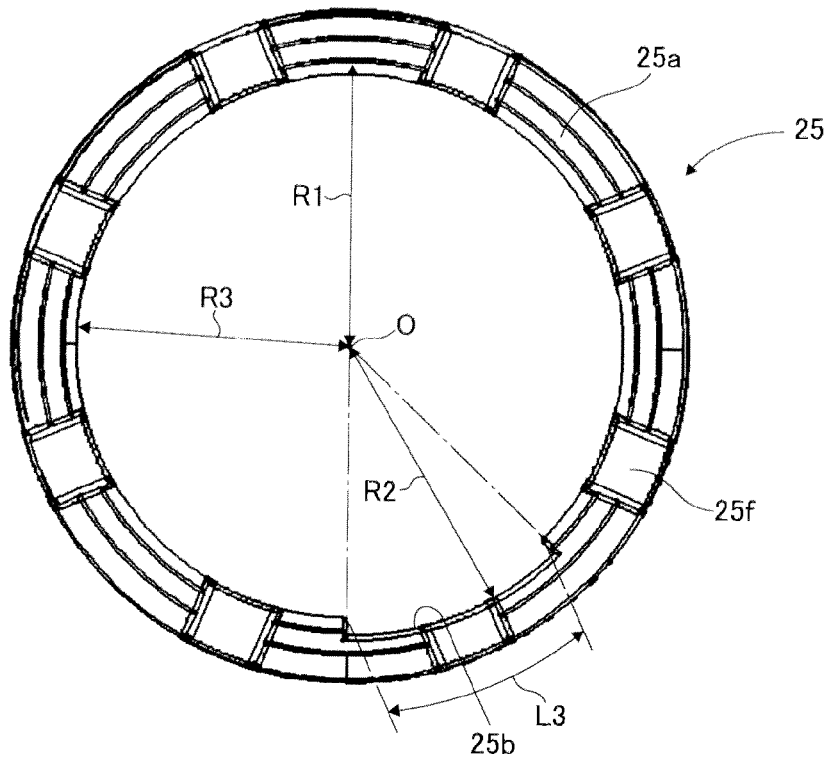
FIG. 9 is a front view of the lock ring.
Figure 10:
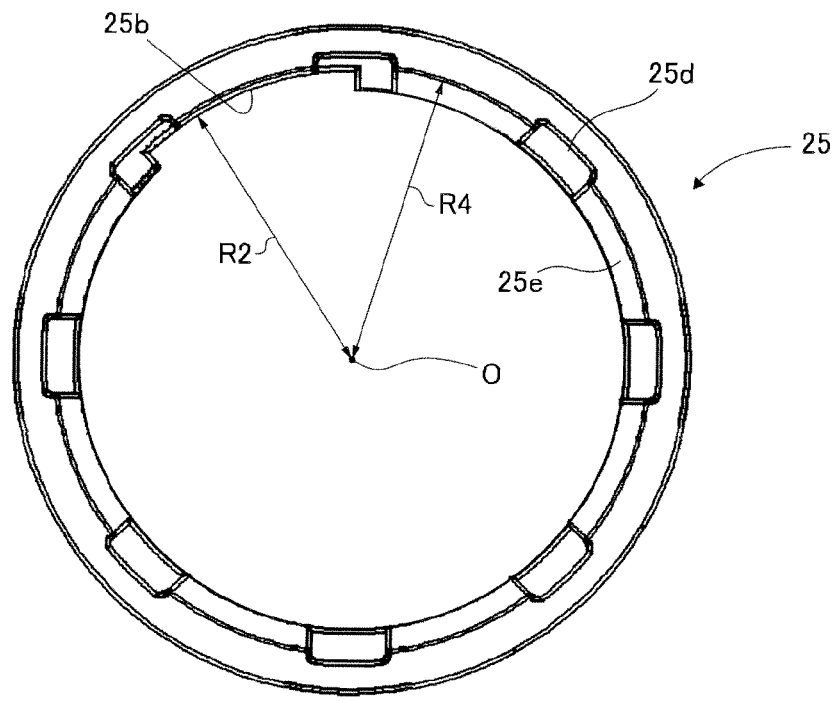
FIG. 10 is a rear view of the lock ring.
Figure 11:
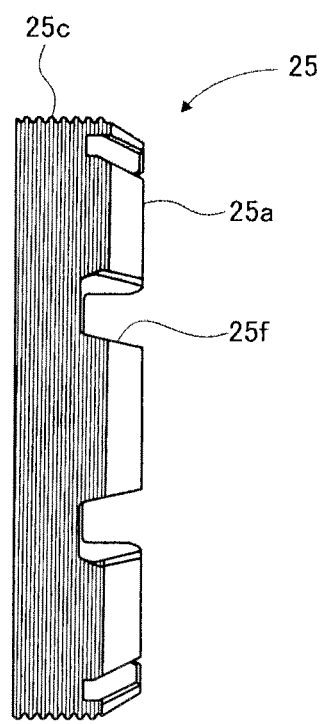
FIG. 11 is a side view of a portion of the lock ring.

FIG. 8 is a perspective view of the lock ring 25. FIG. 9 is a front view of a surface of the lock ring 25 that abuts against the bearing 24. FIG. 10 is a rear view showing an opposite surface of the lock ring 25. FIG. 11 is a side view of the lock ring 25.

The lock ring 25 is circularly formed so as to surround the wheel turning shaft 10. An abutment surface 25*a* is formed on the surface of the lock ring 25 that faces the bearing 24. The abutment surface 25*a* is in abutment with a side surface of the outer race 24*a* of the bearing 24. The abutment surface 25*a* is formed on an inner circumferential side relative to a largest outer diameter of the lock ring 25. Further, a plurality of thinned portions 25*f* is formed at the lock ring 25 by radially cutting out a part of the surface of the lock ring 25 that faces the bearing 24. The thinned portions 25*f* are substantially equally spaced in the circumferential direction of the lock ring 25. The weight of the lock ring 25 can be reduced by these thinned portions 25*f*.

Engagement grooves 25*d* are formed on the opposite surface of the lock ring 25 from the bearing 24 by cutting out a part of the lock ring 25 so as to be opened to an inner circumferential side of the lock ring 25. The engagement grooves 25*d* are grooves that are engaged with a tool which is used to fix the lock ring 25 to the first housing 30. The engagement grooves 25*d* are substantially equally spaced in the circumferential direction of the lock ring 25. The thinned portions 25*f* and the engagement grooves 25*d* are circumferentially alternately located, when the lock ring 25 is viewed from an axial direction thereof. This arrangement allows the lock ring 25 to have a sufficient thickness in the axial direction thereof, thereby securing a sufficient strength.

A threaded male screw portion 25*c* is formed along an outer circumference of the lock ring 25. A threaded female screw portion 30*a* is formed at a position of an inner circumferential surface of the first housing 30 that faces the male screw portion 25*c* (i.e., a position of the inner circumferential surface of the first housing 30 that is located adjacent to the position where the bearing 24 is disposed). The male screw portion 25*c* is threadably engaged with the female screw portion 30*a*, by which the lock ring 25 is fixed to the first housing 30.

A cutout portion 25*b* is formed on the inner circumference of the lock ring 25 by cutting out a part of the lock ring 25 in the circumferential direction. A tapered portion 25*e* is formed on the surface of the lock ring 25 opposite from the bearing 24 of the nut 20. The tapered portion 25*e* has an inner circumferential diameter gradually reducing from an opening of the lock ring 25 opposite from the bearing 24 of the nut 20 toward the bearing 24. The tapered portion 25*e* is formed so as to have a largest diameter equal to the diameter of the cutout portion 25*b*. The smallest diameter of the tapered portion 25*e* is the smallest diameter of the nut 20.

Assuming that R2 is a distance from a rotational axis O of the nut 20 to a radially inner end of the cutout portion 25*b*, and R1 is a distance from the rotational axis O to a radially inner end of the abutment surface 25*a*, the cutout portion 25*b* is formed in such a manner that the distance R2 is longer than the distance R1. Further, the cutout portion 25*b* is formed in such a manner that a width L3 (refer to FIG. 9) of the cutout portion 25*b* in the circumferential direction is wider than a width L1 (refer to FIG. 7) of the circulation member 23 in the direction perpendicular to the longitudinal direction of the circulation member 23. In other words, the circulation member 23 is formed in such a manner that the width L1 (refer to FIG. 7) of the circulation member 23 in the direction perpendicular to the longitudinal direction is narrower than the width L3 (refer to FIG. 9) of the cutout portion 25*b* in the circumferential direction. Further, the cutout portion 25*b* is formed in such a manner that the width L3 of the cutout portion 25*b* in the circumferential direction is narrower than a width L2 (refer to FIG. 6) in the circumferential direction when the circulation member 23 is mounted on the nut 20.

Further, assuming that R3 is a distance from the rotational axis O to a surface of the lock ring 25 on an innermost side (except for the cutout portion 25*b*) (an inner diameter of the lock ring 25 on one axial end side: refer to FIG. 9), and R5 is a distance from the rotational axis O to a farthest position of the circulation member 23 of the nut 20 (a largest outer diameter: refer to FIG. 6), the lock ring 25 is formed in such a manner that the distance R3 is shorter than the distance R5. Further, assuming that R4 is a distance from the rotational axis O to an end surface of an opening of the lock ring 25 opposite from the bearing 24, i.e., an end surface of an opening of the tapered portion 25*e* (an inner diameter of the lock ring 25 on an opposite axial end side of the lock ring: refer to FIG. 10), and R5 is the distance from the rotational axis O to the farthest position of the circulation member 23 of the nut 20 (the largest outer diameter of the nut 20: refer to FIG. 6), the lock ring 25 is formed in such a manner that the distance R4 is shorter than the distance R5.

The rotational axis O, about which the nut 20 rotates in the housing 20, coincides with an axis of the wheel turning shaft 10, and also coincides with a rotational axis when the lock ring 25 is threadably engaged with the first housing 30.

[Process for Mounting Nut]

Figure 12:
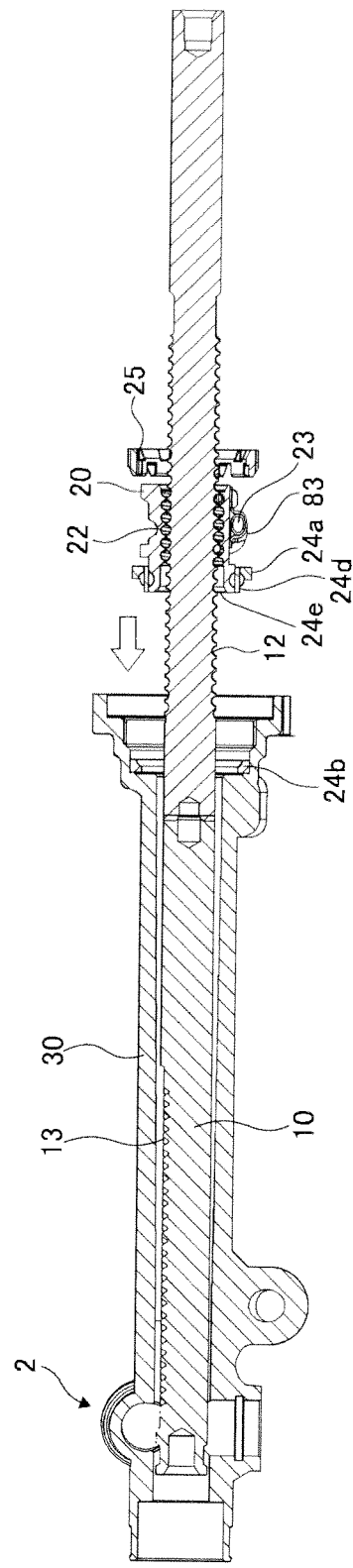
FIG. 12 is a partial cross-sectional view of the power steering apparatus according to the first embodiment, illustrating how the nut is mounted in a first housing.

FIG. 12 illustrates how the nut 20 is mounted in the first housing 30. The outer race 24*b*, which is one of the outer races of the bearing 24, is press-fitted in the first housing 30 before the nut 20 is mounted.

The nut 20 is provided around the wheel turning shaft (in other words, the wheel turning shaft 10 is inserted through the nut 20) with the ball 24*d* of the bearing 24 and the outer race 24*a*, which is the other of the outer races of the bearing 24, attached to the nut 20. The nut 20 is inserted in the first housing 30 with the balls 22 loaded in the ball circulation groove 12 and then the circulation member 23 mounted thereon. After that, the lock ring 25 is moved toward the outer race 24*a* while being provided around the nut (in other words, the nut 20 is inserted in the lock ring 25) and being threadably engaged with the first housing 30. As a result, the abutment surface 25*a* of the lock ring 25 is brought into abutment with the side surface of the outer race 24*a*. The lock ring 25 is further threadably engaged with the first housing 30 with the abutment surface 25*a* of the lock ring 25 being in abutment with the side surface of the outer race 24*a*, thereby completing the attachment of the lock ring 25 to the first housing 30. In this manner, the outer races 24*a* and 24*b* of the bearing 24 are sandwiched between the abutment surface 25*a* of the lock ring 25 and the side surface 30*b* of the first housing 30, thereby axially positioning the nut 20 relative to the first housing 30.

Figure 13A:
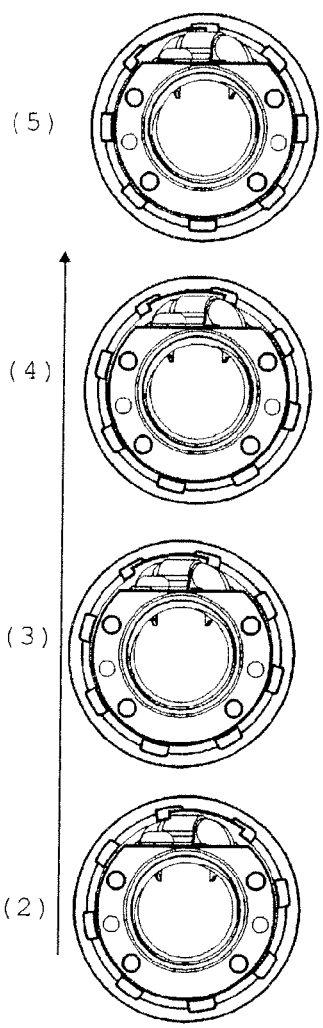
FIGS. 13A (1) to (5) are front views illustrating how the lock ring is provided around the nut.
Figure 13B:
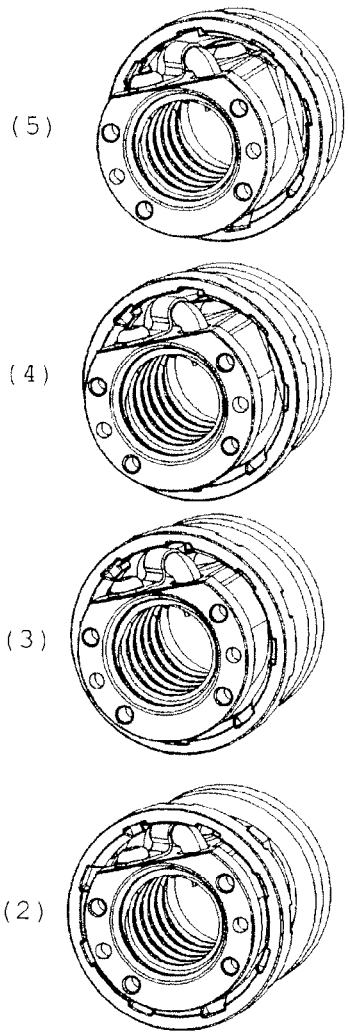
FIGS. 13B (1) to (5) are perspective views illustrating how the lock ring is provided around the nut.
Figure 13C:
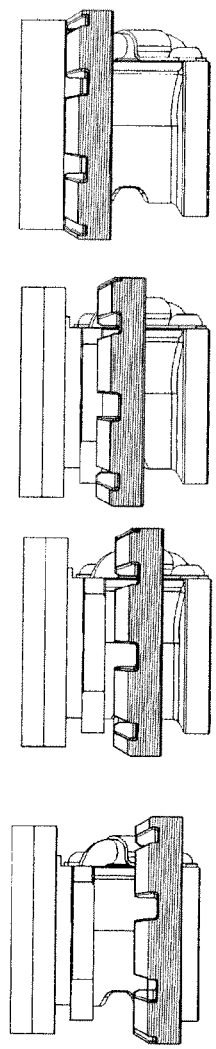
FIGS. 13C (1) to (5) are side views illustrating how the lock ring is provided around the nut.

FIGS. 13A, 13B, and 13C illustrate how the nut 20 is inserted in the lock ring 25 (in other words, the lock ring 25 is provided around the nut 20). In FIGS. 13A, 13B, and 13C, how the lock ring 25 is provided around the nut 20 is illustrated from the bottom views to the top views. Further, for improvement of visibility, the components are labeled only in the lowermost views, FIGS. 13A(1), 13B(1), and 13C(1).

The cutout portion 25*b* is formed in such a manner that the width L3 (refer to FIG. 9) of the cutout portion 25*b* of the lock ring 25 in the circumferential direction is narrower than the width L2 (refer to FIG. 6) in the circumferential direction when the circulation member 23 is mounted on the nut 20. Therefore, as illustrated in FIGS. 13A, 13B, and 13C, the lock ring 25 is provided around the nut 20 (in other words, the nut 20 is inserted in the lock ring 25) while being rotated relative to the nut 20 according to the position of the circulation member 23 disposed obliquely relative to the axial direction of the nut 20. Obviously, the lock ring 25 may be provided around the nut 20 by rotating the nut 20 relative to the lock ring 25.

First, as illustrated in FIGS. 13A(1), 13B(1), and 13C(1), the lock ring 25 is provided around the end of the nut 20 where the circulation member 23 is disposed. Next, as illustrated in FIGS. 13A(2), 13B(2), and 13C(2), the lock ring 25 is moved toward the bearing 24 while being kept in the same state. At this time, the lock ring 25 abuts against the circulation member 23 of the nut 20. Then, as illustrated in FIGS. 13A (3) to (5), 13B (3) to (5), and 13C (3) to (5), the lock ring 25 is moved toward the bearing 24 while being rotated relative to the nut 20 in such a manner that the cutout portion 25*b* of the lock ring 25 is aligned with the circulation member 23 of the nut 20. In this manner, the lock ring 25 can pass over the circulation member 23 of the nut 20.

[Function and Advantageous Effects]

The size of the bearing 24 is dimensioned according to the diameter of the abutment surface 25a in such a manner that the outer race 24a of the bearing 24 is in abutment with the abutment surface 25a of the lock ring 25. However, determining the inner diameter of the lock ring 25 according to the largest outer diameter of the nut 20 (the distance R5: refer to FIG. 6) results in an increase in the diameter of the abutment surface 25a, thereby leading to an increase in the diameter of the bearing 24.

Further, the thickness of the lock ring 25 in the radial direction should be thick enough to secure a sufficient strength. Therefore, determining the inner diameter of the lock ring 25 according to the largest outer diameter of the nut 20 (the distance R5) results in an increase in the outer diameter of the lock ring 25.

Therefore, according to the first embodiment, the cutout portion 25b is formed on the inner circumference of the lock ring 25 so as to prevent the lock ring 25 from interfering with the circulation member 23. The cutout portion 25b is formed in such a manner that the distance R2 from the rotational axis of the nut 20 to the radially inner end of the cutout portion 25b is longer than the distance R1 (refer to FIG. 9) from the rotational axis of the nut 20 to the radially inner end of the abutment surface 25a.

The formation of the cutout portion 25b on the inner circumference of the lock ring 25 as described above leads to a reduction in the inner diameter of the lock ring 25 while allowing the lock ring 25 to be provided around the nut 20 or the nut 20 to be inserted in the lock ring 25 in such a manner that the lock ring 25 is prevented from interfering with the circulation member 23. In other words, the lock ring 25 has a large inner diameter at the portion of the abutment surface 25a where the cutout portion 25b is formed, but has a small diameter at the remaining portion, thereby securing a sufficient area of the abutment surface 25a. This also allows a reduction in the diameter of the bearing 24. Further, the lock ring 25 can have a small inner diameter at a portion other than the cutout portion 25b, thereby avoiding an increase in the outer diameter of the lock ring 25 while even securing a sufficient radial thickness.

The size of the lock ring 25 in the axial direction should be wide enough to allow sufficient formation of the male screw portion 25c to ensure generation of a force for coupling the lock ring 25 to the first housing 30. However, preparing a space corresponding to the axial whole length of the lock ring 25 at the nut 20 results in an increase in the size of the nut 20.

Therefore, according to the first embodiment, the lock ring 25 is formed in such a manner that the inner diameter of the side of the lock ring 25 that faces the bearing 24 (the distance R3: refer to FIG. 9) is smaller than the outermost diameter of the circulation member 23 (the distance R5: refer to FIG. 6), while the inner diameter of the side of the lock ring 25 opposite from the bearing 24 (the distance R4: FIG. 10) is larger than the outermost diameter of the circulation member 23 (the distance R5).

As a result, the inner diameter of the abutment surface 25a can be reduced, and therefore the diameter of the bearing 24 can also reduce. Further, the inner diameter of the side of the lock ring 25 opposite from the bearing 24 (the distance R4) is larger than the outermost diameter of the circulation member 23 (the distance R5). Therefore, the circulation member 23 is prevented from interfering with the lock ring 25 when the nut 20 rotates even if the lock ring 25 and a part of the circulation member 23 overlap with each other in the axial direction. Accordingly, the axial length of the nut 20 can be reduced, avoiding an increase in the size of the nut 20.

A sufficient number of balls 22 should be loaded in the ball circulation groove 12 to disperse a force applied to the balls 22 to secure durability of the screw mechanism 26. For this purpose, the ball circulation groove 12 should be long enough to accommodate the sufficient number of balls 22. The length of the ball circulation groove 12 is determined based on the position where the circulation member 23 is inserted. It is desirable to mount the circulation member 23 on the nut 20 in such a manner that the longitudinal direction of the circulation member 23 extends obliquely relative to the rotational axis of the nut 20 to maximally reduce the axial direction of the nut 20 while securing a sufficient length of the ball circulation groove 12. However, mounting the circulation member 23 on the nut 20 in this manner results in an increase in the circumferential width occupied by the circulation member 23 (the width L2: refer to FIG. 6) when the nut 20 is viewed from the axial direction, leading to the necessity of forming the cutout portion 25b of the lock ring 25 so as to have a wide circumferential width. The increase in the circumferential width of the cutout portion 25b requires an increase in the outer diameter of the abutment surface 25a to secure a sufficient area where the abutment surface 25a and the outer race 24a of the bearing 24 abut against each other, thereby requiring a selection of a bearing having a large diameter as the bearing 24. Further, the size of the lock ring 25 increases to secure a sufficient radial thickness of the lock ring 25 in consideration of a reduction in the strength due to the enlarged cutout portion 25b.

Therefore, according to the first embodiment, the circulation member 23 is formed in such a manner that the width of the circulation member 23 perpendicular to the longitudinal direction of the ball circulation groove 12 (the width L1: refer to FIG. 7) is narrower than the circumferential width of the cutout portion 25b (the width L3: refer to FIG. 9). Further, the cutout portion 25b is formed in such a manner that the circumferential width of the cutout portion 25b (the width L3) is narrower than the circumferential width of the circulation member 23 when the circulation member 23 is mounted on the nut 20 (the width L2: refer to FIG. 6).

As a result, the lock ring 25 can be disposed around the nut 20 while being prevented from interfering with the circulation member 23 by providing the lock ring 25 around the nut 20 while rotating the lock ring 25 according to the obliquely disposed circulation member 23.

Further, according to the first embodiment, the engagement grooves 25d, which are engaged with the tool (not illustrated), are formed on the side surface of the lock ring 25 opposite from the bearing 24 so as to be opened on the inner circumferential sides of the engagement grooves 25d.

Therefore, shaping the engagement grooves 25d into concaves opened on the inner circumferential side of the lock ring 25 leads to a reduction in the radial dimensions of the engagement grooves 25d to allow a reduction in the outer diameter of the lock ring 25, compared to use of a tool having a plurality of holes as engagement portions and the lock ring having protrusions to be fitted in the holes.

Further, according to the first embodiment, the plurality of engagement grooves 25 of the lock ring 25 is substantially equally spaced in the circumferential direction of the lock ring 25.

Therefore, a torque can be evenly applied to the engagement grooves 25d.

In this way, the power steering apparatus 1 according to the first embodiment is configured in the following manner.

(1) The wheel turning shaft 10 axially moves according to a rotation of the steering wheel, thereby turning the wheel to be steered.

The spirally grooved wheel turning shaft-side ball screw groove 11 is formed on the outer circumferential side of the wheel turning shaft 10.

The nut 20 is annularly disposed so as to surround the wheel turning shaft 10. Further, the nut 20 is mounted so as to be rotatable relative to the wheel turning shaft 10.

The spirally grooved nut-side ball screw groove 21, which defines the ball circulation groove 12 together with the wheel turning shaft-side ball screw groove 11, is formed on the inner circumferential side of the nut 20.

The plurality of balls 22 is disposed in the ball circulation groove 12.

The circulation member 23, which connects the one end side and the opposite end side of the ball circulation groove 12, is disposed on the radially outer side of the nut 20 so that the plurality of balls 22 can circulate from the one end side to the opposite end side of the ball circulation groove 12.

The first housing 30 (a housing) is formed so as to contain at least the one axial end side of the nut 20 relative to the circulation member 23.

The bearing 24 is annularly formed so as to surround the nut 20, and rotatably supports the nut 20 so that the nut 20 is rotatable in the first housing 30. The bearing 24 is disposed at the one axial end side relative to the circulation member 23 between the nut 20 and the first housing 30.

The circularly formed lock ring 25 (a fixation member) is disposed so as to surround the wheel turning shaft 10. The lock ring 25 includes the abutment surface 25*a* in abutment with the end surface of the bearing 24 on the one side in the direction of the rotational axis of the bearing 24. The lock ring 25 is fixed in the first housing 30 with the abutment surface 25*a* thereof in abutment with the end surface of the bearing 24 on the one side in the axial direction of the bearing 24, thereby fixing the bearing 24 to the first housing 30. Further, the lock ring 25 is provided around the nut 20 by being moved from the opposite end side toward the one end side of the nut 20 in the axial direction of the nut at the time of assembling.

The ball screw mechanism 26 can include the wheel turning shaft-side ball screw groove 11, the nut 20, the nut-side ball screw groove 21, the plurality of balls 22, the circulation member 23, the first housing 30 (the housing), the bearing 24, and the lock ring 25.

The plurality of balls 22 moves in the ball circulation groove 12 according to a rotation of the nut 20 relative to the wheel turning shaft 10, by which the wheel turning shaft 10 moves relative to the nut 20 in the longitudinal direction of the wheel turning shaft 10.

The power steering apparatus includes the electric motor 40 configured to provide a rotational force to the nut 20 so that the nut 20 rotates relative to the wheel turning shaft 10.

The abutment surface 25*a* of the lock ring 25 is formed on at least the radially inner side of the lock ring 25.

The lock ring 25 includes the cutout portion 25*b* provided on the radially inner side of the lock ring 25 and formed so as to prevent the lock ring 25 from interfering with the circulation member 23 when the lock ring 25 is inserted in the first housing 30.

The cutout portion 25*b* is formed in such a manner that the distance R2 from the rotational axis of the nut 20 to the radially inner end of the cutout portion 25*b* is longer than the distance R1 from the rotational axis of the nut 20 to the radially inner end of the abutment surface 25*a*.

Therefore, the diameter of the bearing 24 can be reduced. Further, the inner diameter of the lock ring 25 can be reduced except for the cutout portion 25*b* of the lock ring 25, thereby avoiding an increase in the outer diameter of the lock ring 25 while even securing a sufficient thickness in the radial direction.

(2) The first housing 30 may include the female screw portion 30*a* formed on the inner circumferential side.

The lock ring 25 can include the male screw portion 25C formed on the outer circumferential side of the ring and configured to be threadably engaged with the female screw portion 30*a* of the first housing 30.

The distance from the rotational axis of the nut 20 to the inner circumferential surface of the lock ring 25 can be an inner diameter of the lock ring 25.

The distance between the farthest position of the circulation member 23 from the rotational axis of the nut 20 and the rotational axis of the nut 20 can be a largest outer diameter of the circulation member 23 (the distance R5).

The lock ring 25 may be formed in such a manner that the inner diameter of the lock ring 25 on the one end side in the axial direction of the ring (the distance R3) is smaller than the largest outer diameter of the circulation member 23 (the distance R5).

The lock ring 25 can be formed in such a manner that the inner diameter of the lock ring 25 on the opposite end side in the axial direction of the ring (the distance R4) is larger than the largest outer diameter of the circulation member 23 (the distance R5) so as to prevent the lock ring 25 from interfering with the circulation member 23.

This arrangement allows a reduction in the inner diameter of the abutment surface 25*a*, thereby allowing the lock ring 25 to have a sufficient area of the abutment surface 25*a*. Therefore, the diameter of the bearing 24 can also reduce. Further, the inner diameter of the side of the lock ring 25 opposite from the bearing 24 (the distance R4) is larger than the largest outer diameter of the circulation member 23 (the distance R5). Therefore, even disposing the lock ring 25 in such a manner that the lock ring 25 axially overlaps a part of the circulation member 23 does not lead to interference of the circulation member 23 with the lock ring 25 when the nut 20 rotates. Therefore, the axial length of the nut 20 can be reduced, preventing an increase in the size of the ball screw mechanism 26.

(3) The rotational axis of the nut 20 can be a central axis of the nut 20.

The circulation member 23 may be disposed on the nut 20 in such a manner that the longitudinal direction of the circulation member 23 extends obliquely relative to the central axis.

The circulation member 23 can be formed in such a manner that the width (the width L1) of the circulation member 23 in the direction perpendicular to the longitudinal direction of the circulation member 23 is narrower than the circumferential width of the cutout portion 25*b* (the width L3).

The cutout portion 25*b* may be formed in such a manner that the circumferential width of the cutout portion 25*b* (the width L3) is narrower than the circumferential width of the circulation member 23 (the width L2) when the circulation member 23 is mounted on the nut 20.

Therefore, the lock ring 25 can be disposed around the nut 20 without interfering with the circulation member 23 by providing the lock ring 25 around the nut 20 while rotating the lock ring 25 according to the obliquely disposed circulation member 23.

(4) The first housing 30 may include the female screw portion 30*a* formed on the inner circumferential surface thereof. The lock ring 25 can include the male screw portion 25*c* formed on the outer circumferential side thereof and configured to be threadably engaged with the female screw portion 25c of the first housing 30, and the engagement grooves 25d formed so as to be opened on the inner circumferential side and configured to be engaged with the tool when the lock ring 25 is threadably engaged with the first housing 30.

Therefore, forming the engagement grooves 25d into concaves opened on the inner circumferential side leads to a reduction in the radial dimensions of the engagement grooves 25d to allow a reduction in the outer diameter of the lock ring 25, compared to engagement grooves shaped into holes.

(5) The plurality of engagement grooves 25 of the lock ring 25 may be substantially equally spaced in the circumferential direction of the lock ring 25, assuming that the rotational axis of the nut 20 is the central axis.

Therefore, a torque can be evenly applied to the engagement grooves 25d.

(6) Further, according to the above-described embodiment, it is possible to provide the reduction mechanism disposed between the electric motor 40 and the wheel turning shaft 10, and designed to be used with the power steering apparatus configured to generate a steering assist force by transmitting a rotational force of the electric motor 40 to the wheel turning shaft 10.

The reduction mechanism for the power steering apparatus is configured in the following manner.

The spirally grooved wheel turning shaft-side ball screw groove 11 is formed on the outer circumferential side of the wheel turning shaft 10. The nut 20 is mounted so as to be rotatable relative to the wheel turning shaft 10, and is annularly disposed so as to surround the wheel turning shaft 10. The nut-side ball screw groove 21 is formed on the inner circumferential side of the nut 20, and is shaped into a spiral groove. The nut-side ball screw groove 21 defines the ball circulation groove 12 together with the wheel turning shaft-side ball screw groove 11. The plurality of balls 22 is loaded in the ball circulation groove 12. The circulation member 23 is disposed on the radially outer side of the nut 20. The circulation member 23 connects the one end side and the opposite end side of the ball circulation groove 12 so that the plurality of balls 22 can circulate from the one end side to the opposite end side of the ball circulation groove 12. The direction along the rotational axis of the nut 20 is the axial direction. The first housing 30 is formed so as to contain at least the one axial end side of the nut 20 relative to the circulation member 23. The bearing 24 rotatably supports the nut 20 so that nut 20 is rotatable in the housing 30. The bearing 24 is disposed between the nut 20 and the first housing 30, and is disposed on the one axial end side opposite from the circulation member 23. The bearing 24 is annularly formed so as to surround the nut 20. The lock ring 25 is circularly formed so as to surround the wheel turning shaft 10. The lock ring 25 includes the abutment surface 25a in abutment with the end surface of the bearing 24 on the one axial side. The lock ring 25 is fixed in the first housing with the abutment surface 25a thereof in abutment with the bearing 24. As a result, the bearing 24 is fixed to the first housing 30. The lock ring 25 is provided around the nut 20 by being moved from the opposite axial end side to the one axial end side of the nut 20 at the time of assembling. The plurality of halls 22 moves in the ball circulation groove 12 according to a rotation of the nut 20 relative to the wheel turning shaft 10. As a result, the wheel turning shaft 10 moves relative to the nut 20 in the longitudinal direction of the wheel turning shaft 10. The abutment surface 25a of the lock ring 25 is formed on at least the radially inner side of the lock ring 25. The lock ring 25 includes the cutout portion 25b provided on the radially inner side of the lock ring 25 and formed so as to prevent the lock ring 25 from interfering with the circulation member 23 when the lock ring 25 is inserted in the first housing 30. The cutout portion 25b is formed in such a manner that the distance R2 from the rotational axis of the nut 20 to the radially inner end of the cutout portion 25b is longer than the distance R1 from the rotational axis of the nut 20 to the radially inner end of the abutment surface 25a.

According to this configuration, the inner diameter of the abutment surface 25a can be reduced, thereby securing a sufficient area of the abutment surface 25a. Therefore, the diameter of the bearing 24 can be also reduced. Further, the inner diameter of the side of the lock ring 25 opposite from the bearing 24 (the distance R4) is larger than the largest outer diameter of the circulation member 23 (the distance R5). Therefore, the lock ring 25 can be disposed in such a manner that the lock ring 25 axially overlaps a part of the circulation member 23. This is because the circulation member 23 does not interfere with the lock ring 25 when the nut 20 rotates. Disposing the lock ring 25 in such a manner that the lock ring 25 axially overlaps a part of the circulation member 23 leads to a reduction in the axial length of the nut 20, thereby preventing an increase in the size of the reduction mechanism for the power steering apparatus.

Second Embodiment

According to a second embodiment, the cutout portion 25b of the lock ring 25 is formed at a different position from the first embodiment. Except for that, the second embodiment is similarly configured to the first embodiment, and similar parts to the first embodiment will not be repeatedly described below.

[Structure of Lock Ring]

Figure 14:
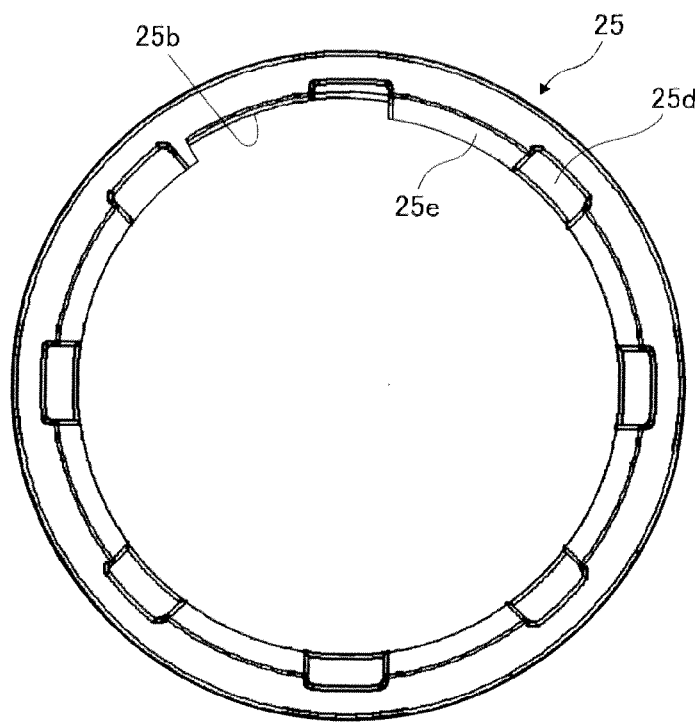
FIG. 14 is a rear view of a modification of the lock ring.

FIG. 14 is a rear view illustrating the surface of the lock ring 25 opposite from the surface of the lock ring 25 in abutment with the bearing 24. The cutout portion 25b is formed in such a manner that a side surface in a direction in which the tool rotates when the lock ring 25 is fixed to the first housing 30, which is one of circumferential end side surfaces of the cutout portion 25b, coincides with a side surface of the engagement groove 25d that abuts against the tool when the lock ring 25 is fixed to the first housing 30.

[Function and Advantageous Effects]

The side surface of the engagement groove 25d in the circumferential direction should have an area large enough to allow reception of a torque from the tool. However, the engagement groove 25d abuts against the tool only on the side surface in the rotational direction when the lock ring 25 is fixed to the first housing 30 (normally, the clockwise direction), whereby the other side surface does not have to have such a large area. As illustrated in FIG. 14, the right side surface of the cutout portion 25b coincides with the right side surface of the engagement groove 25d, by which the cutout portion 25b can be located so as not to interfere with the left side surface of the engagement groove 25d.

Therefore, a torque can be sufficiently transmitted to the lock ring 25 while preventing the torque from being concentrated on a part of the engagement grooves 25d.

The second embodiment provides the following advantageous effects.

(7) The cutout portion 25b is formed in such a manner that one of the circumferential ends of the cutout portion 25b abuts against the tool to allow a rotational torque of the tool to be transmitted to the lock ring 25.

Therefore, a torque can be sufficiently transmitted to the lock ring 25 while preventing the torque from being concentrated on a part of the engagement grooves 25*d*.

Third Embodiment

According to a third embodiment, the lock ring 25 is replaced with a snap ring 29. Similar parts to the first embodiment will not be repeatedly described below.

[Structure of Snap Ring]

Figure 15:
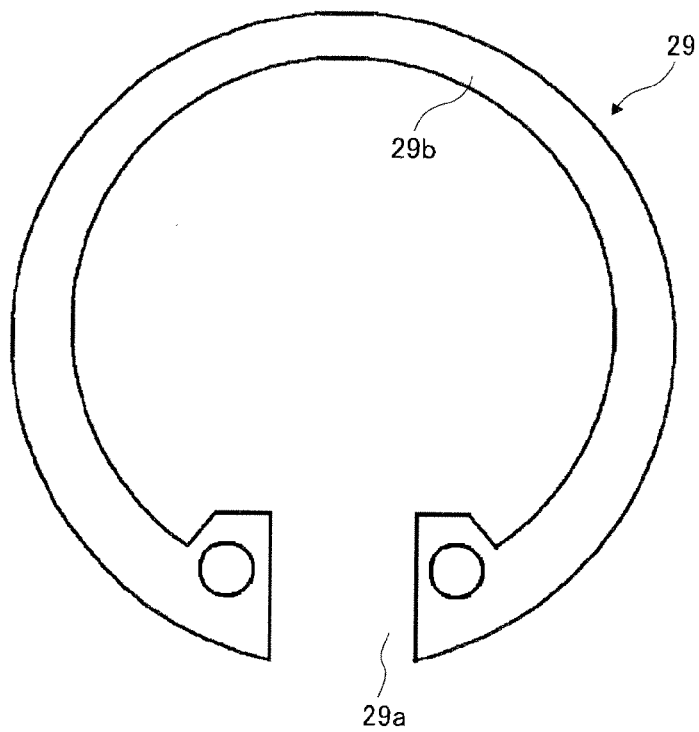
FIG. 15 is a front view of a snap ring used instead of the lock ring.

FIG. 15 is a front view of the snap ring 29. The snap ring 29 is a C-shaped member made from an elastic material. The snap ring 29 is circumferentially deformable, whereby a cutout portion 29*a* may be formed in such a manner that a circumferential width of the cutout portion 29*a* is narrower than the width L1 of the circulation member 23 in the direction perpendicular to the longitudinal direction (refer to FIG. 7) in a natural condition. In this case, the snap ring 29 is biased in a direction for forming the cutout portion 29*a*, i.e., a direction for enlarging the diameter of the snap ring 29.

The snap ring 29 is inserted in the first housing 30 in a circumferentially compressed state so that the cutout portion 29*a* is narrowed with its circumferential ends approaching each other. At this time, the snap ring 29 is provided around the nut 20 while being rotated relative to the nut 20 according to the position of the circulation member 23 in such a manner that the narrowed cutout portion 29*a* is aligned with the circulation member 23. Then, the force of circumferentially compressing the snap ring 29 is released when the snap ring 29 reaches the position adjacent to the bearing 24, thereby elastically returning the snap ring 29 to be extended as illustrated in FIG. 15. At this time, the snap ring 29 is engaged with an engagement groove concavely formed on the inner circumference of the first housing 30 over the whole circumference. As a result, a side surface (the abutment surface 29*b*) of the snap ring 29 except for the cutout portion 29*a* is set into abutment with the outer race 24*a* of the bearing 24, thereby preventing the bearing 24 from axially moving.

[Function and Advantageous Effects]

The snap ring 29 is engaged with the engagement groove in the first housing 20 with the aid of the elastic force, thereby facilitating the work to fix the bearing 24.

Further, the snap ring 29 is fixed to the first housing 30 by being engaged with the engagement groove, and therefore its length in the axial direction can be reduced compared to a member that should be screwed, like the lock ring 25.

In this way, the power steering apparatus according to the third embodiment is configured in the following manner.

(8) The wheel turning shaft 10 axially moves according to a rotation of the steering wheel, thereby turning the wheel to be steered.

The spirally grooved wheel turning shaft-side ball screw groove 11 is formed on the outer circumferential side of the wheel turning shaft 10.

The nut 20 is annularly mounted so as to surround the wheel turning shaft 10. Further, the nut 20 is disposed so as to be rotatable relative to the wheel turning shaft 10.

The spirally grooved nut-side ball screw groove 21, which defines the ball circulation groove 12 together with the wheel turning shaft-side ball screw groove 11, is formed on the inner circumferential side of the nut 20.

The plurality of balls 22 is disposed in the ball circulation groove 12.

The circulation member 23, which connects the one end side and the opposite end side of the ball circulation groove 12, is disposed on the radially outer side of the nut 20 so that the plurality of balls 22 can circulate from the one end side to the opposite end side of the ball circulation groove 12.

The first housing 30 (the housing) is formed so as contain at least the one axial end side of the nut 20 relative to the circulation member 23.

The bearing 24 is annularly formed so as to surround the nut 20, and rotatably supports the nut 20 so that the nut 20 is rotatable in the first housing 30. The bearing 24 is disposed at the one axial end side relative to the circulation member 23 between the nut 20 and the first housing 30.

The snap ring 29 (the fixation member) is disposed so as to surround the wheel turning shaft 10. The snap ring 29 includes the abutment surface 29*b* in abutment with the end surface of the bearing 24 on the one axial side.

The snap ring 29 is fixed in the first housing 30 with the abutment surface 29*b* thereof in abutment with the end surface of the bearing 24 on the one axial side, thereby fixing the bearing 24 to the first housing 30.

The snap ring 29 is provided around the nut 20 by being moved from the opposite axial end side toward the one axial end side of the nut 20 at the time of assembling.

The ball screw mechanism 26 can include the wheel turning shaft-side ball screw groove 11, the nut 20, the nut-side ball screw groove 21, the plurality of balls 22, the circulation member 23, the first housing 30 (the housing), the bearing 24, and the snap ring 29.

The plurality of balls 22 moves in the ball circulation groove 12 according to a rotation of the nut 20 relative to the wheel turning shaft 10, by which the wheel turning shaft 10 moves relative to the nut 20 in the longitudinal direction of the wheel turning shaft 10.

The power steering apparatus includes the electric motor 40 configured to provide a rotational force to the nut 20 so that the nut 20 rotates relative to the wheel turning shaft 10.

Assuming that the central axis is the rotational axis of the nut 20, the snap ring 29 is arcuately formed so as to have the cutout portion 29*a* opened over a predetermined range in the circumferential direction.

The cutout portion 29*a* is formed in such a manner that the snap ring 29 is prevented from interfering with the circulation member 23 when the snap ring 29 is inserted into the housing.

The abutment surface 29*b* is formed over a circumferential range except for the cutout portion 29*a*.

Therefore, the sizes of the bearing 24 and the snap ring 29 can be reduced.

(9) The first housing 30 can include the engagement groove provided on the inner circumferential side and formed so as to circumferentially extend.

The snap ring 29 is made from an elastic material. Therefore, the snap ring 29 is inserted into the first housing 30 in a compressed state. At this time, the snap ring 29 is set into an extended state from the compressed state so as to be engaged with the engagement groove, thereby fixing the bearing 24 to the first housing 30.

Therefore, the third embodiment can facilitate the work to fix the bearing 24 to the first housing 30.

Fourth Embodiment

According to a fourth embodiment, the lock ring 25 according to the first embodiment is replaced with a lock plate 34. Similar parts to the first embodiment will not be repeatedly described below.

[Structure of Lock Plate]

A cutout portion 34*a* is formed on an inner circumference of the lock plate 34 by cutting out a part of the lock plate 34 in a circumferential direction. A plurality of radially protruding flange portions 34c is formed on an outer circumference of the lock plate 34. Threaded holes 34b are formed at the flange portions 34c. The lock plate 34 is threadedly coupled to the first housing 30 by screws (not illustrated) via the threaded holes 34b. As a result, a side surface (an abutment surface 34d) of the lock plate 34 is set into abutment with the outer race 24a of the bearing 24, thereby preventing the bearing 24 from axially moving.

Figure 16:
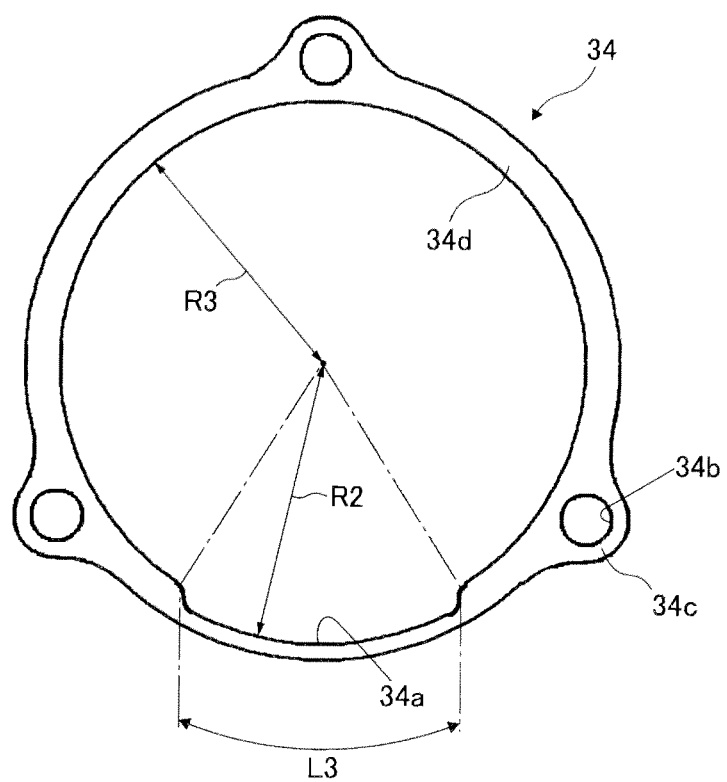
FIG. 16 is a front view of a lock plate used instead of the lock ring.

The cutout portion 34a is formed in such a manner that a width L3 of the cutout portion 34a in the circumferential direction (refer to FIG. 16) is wider than the width L1 of the circulation member 23 in the direction perpendicular to the longitudinal direction (refer to FIG. 7). In other words, the circulation member 23 is formed in such a manner that the width L1 of the circulation member 23 in the direction perpendicular to the longitudinal direction (refer to FIG. 7) is narrower than the width L3 of the cutout portion 34a in the circumferential direction (refer to FIG. 16). Further, the cutout portion 34a is formed in such a manner that the width L3 of the cutout portion 34a in the circumferential direction is narrower than the width L2 of the circulation member 23 in the circumferential direction when the circulation member 23 is mounted on the nut 20 (refer to FIG. 6).

Further, the lock plate 34 is formed in such a manner that a distance R3 from the rotational axis O to an innermost surface of the lock plate 34 (except for the cutout portion 34a) (refer to FIG. 16) is shorter than the distance R5 from the rotational axis O to the farthest position of the circulation member 23 of the nut 20 (the largest outer diameter: refer to FIG. 6).

The lock plate 34 can be disposed around the nut 20 without interfering with the circulation member 23 by providing the lock plate 34 around the nut 20 while rotating the lock plate 34 according to the obliquely disposed circulation member 23 when mounting the lock plate 34 around the nut 20.

[Function and Advantageous Effects]

The lock plate 34 is coupled to the first housing 30 by the screws, whereby its length in the axial direction can be reduced compared to a member that should be screwed, like the lock ring 25.

The fourth embodiment provides the following advantageous effects.

(10) The lock plate 34, which is coupled to the first housing 30 by the screws, is used as the fixation member for fixing the bearing 24 to the first housing 30.

Therefore, the length of the lock plate 34 in the axial direction can be reduced, and the lock plate 34 can be prevented from interfering with the circulation member 23 after being coupled to the first housing 30.

According to one aspect of the present invention, a power steering apparatus comprises a wheel turning shaft (rack) configured to turn a wheel to be steered by being moved in the axial direction of the shaft according to a rotation of a steering wheel, a ball screw mechanism configured to cause the wheel turning shaft to move in the axial direction of the wheel turning shaft, and an electric motor configured to provide a rotational force to the wheel turning shaft via the ball screw mechanism. The ball screw mechanism includes a wheel turning shaft-side ball screw groove formed on an outer circumferential side of the wheel turning shaft and shaped into a spiral groove, and a nut disposed to surround the wheel turning shaft and to be rotatable relative to the wheel turning shaft. The nut has a rotational axis. The nut has one end side and an opposite end side in a direction along the rotational axis. The ball screw mechanism further includes a nut-side ball screw groove formed on an inner circumferential side of the nut. The nut-side ball screw groove is shaped into a spiral groove, and defines a ball circulation groove together with the wheel turning shaft-side ball screw groove. The ball screw mechanism further includes a plurality of balls disposed in the ball circulation groove, a circulation member (tube) disposed on an outer side of the nut in a radial direction relative to the rotational axis and configured to connect one end side and an opposite end side of the ball circulation groove so that the plurality of balls can circulate from the one end side to the opposite end side of the ball circulation groove, a housing formed to contain at least the one end side of the nut relative to the circulation member in the direction along the rotational axis, and a bearing disposed on the one end side relative to the circulation member in the direction along the rotational axis between the nut and the housing. The bearing is formed to surround the nut, and rotatably support the nut in the housing. The ball screw mechanism further includes a circular fixation member formed to surround the wheel turning shaft and provided with an abutment surface in abutment with an end surface of the bearing on one side in the direction along the rotational axis. The fixation member is configured to fix the bearing to the housing by being fixed in the housing with the abutment surface in abutment with the end surface of the bearing on the one side in the direction along the rotational axis. The fixation member is provided around the nut by being moved from the opposite end side to the one end side of the nut in the direction along the rotational axis at the time of assembling. The plurality of balls moves in the ball circulation groove according to a rotation of the nut relative to the wheel turning shaft, thereby causing the wheel turning shaft to move relative to the nut in the longitudinal direction of the wheel turning shaft. The electric motor is arranged to provide a rotational force to the nut so that the nut rotates relative to the wheel turning shaft. The abutment surface of the fixation member is formed on at least an inner side of the fixation member in the radial direction. The fixation member includes a cutout portion provided on the inner side of the fixation member in the radial direction, and formed to prevent the fixation member from interfering with the circulation member when the fixation member is inserted in the housing. The cutout portion is formed in such a manner that a distance from the rotational axis of the nut to an inner end of the cutout portion in the radial direction is longer than a distance from the rotational axis of the nut to an inner end of the abutment surface in the radial direction.

The fixation member is formed in such a manner that the cutout portion overlaps the abutment surface in the radial direction, whereby it is possible to reduce the size of the fixation member while securing a sufficient width of the abutment surface in the radial direction, compared to a fixation member having an inner diameter set according to a largest diameter of the circulation member. Although the area of the abutment surface reduces at a portion where the cutout portion is formed, a sufficient fixation force can be maintained at a portion of the abutment surface other than the cutout portion.

In the above-described power steering apparatus, the housing may include a female screw portion formed on an inner circumferential side thereof. The fixation member may include a male screw portion formed on an outer circumferential side thereof and configured to be threadably engaged with the female screw portion of the housing. A distance from the rotational axis of the nut to an inner circumferential surface of the fixation member may be an inner diameter of the fixation member. A distance between a farthest position of the circulation member from the rotational axis of the nut and the rotational axis of the nut may be a largest outer diameter of the circulation member. One end side of the fixation member in the direction along the rotational axis may be formed in such a manner that the inner diameter of the one end side of the fixation member in the direction along the rotational axis is smaller than the largest outer diameter of the circulation member. An opposite end side of the fixation member in the direction along the rotational axis may be formed in such a manner that the inner diameter of the opposite end side of the fixation member in the direction along the rotational axis is larger than the largest outer diameter of the circulation member so as to prevent the fixation member from interfering with the circulation member.

The reduction in the inner diameter of the fixation member on the one end side in the direction along the rotational axis leads to a reduction in the diameter of the abutment surface in abutment with the bearing, thereby securing a sufficient abutment area without increasing the size of the bearing. On the other hand, the increase in the inner diameter of the fixation member on the opposite end side in the direction along the rotational axis can prevent the fixation member from ng with the circulation member.

In the above-described power steering apparatus, the circulation member may be mounted in such a manner that a longitudinal direction of the circulation member extends obliquely relative to the rotational axis of the nut. Further, the circulation member may be formed in such a manner that a width of the circulation member in the direction perpendicular to the longitudinal direction of the circulation member is narrower than a circumferential width of the cutout portion. The cutout portion may be formed in such a manner that the circumferential width of the cutout portion is narrower than a circumferential width of the circulation member when the circulation member is mounted on the nut.

Forming the fixation member in the above-described manner can reduce the circumferential width of the cutout portion to thereby secure a sufficient area in abutment with the bearing. When the fixation member is mounted, the fixation member is provided around the nut while tilting the fixation member along the longitudinal direction of the circulation member, thereby preventing the fixation member from interfering with the circulation member.

In the above-described power steering apparatus, the housing may include a female screw portion formed on an inner circumferential surface thereof. The fixation member may include a male screw portion formed on an outer circumferential side thereof and configured to be threadably engaged with the female screw portion of the housing, and an engagement groove provided to be opened on an inner circumferential side thereof and configured to be engaged with a tool for threadably engaging the fixation member with the housing.

Forming the engagement groove into concaves opened on the inner circumferential side leads to a reduction in the size of the engagement groove in the radial direction to allow a reduction in the outer diameter of the fixation member, compared to an engagement portion shaped into holes to be engaged with the tool.

In the above-described power steering apparatus, the fixation member may include a plurality of engagement grooves. The plurality of engagement grooves may be substantially equally spaced in a circumferential direction of the fixation member.

A torque can be evenly applied to the engagement grooves.

In the above-described power steering apparatus, the cutout portion may include one circumferential end and an opposite circumferential end, and the one circumferential end may be formed to abut against the tool to transmit a rotational torque of the tool to the fixation member.

It is possible to increase the area of the portion that transmits the rotational torque.

According to another aspect of the present invention, a power steering apparatus comprises a wheel turning shaft (rack) configured to turn a wheel to be steered by being moved in the axial direction of the shaft according to a rotation of a steering wheel, a ball screw mechanism configured to cause the wheel turning shaft to move in the axial direction of the wheel turning shaft, and an electric motor configured to provide a rotational force to the wheel turning shaft via the ball screw mechanism. The ball screw mechanism includes a wheel turning shaft-side ball screw groove formed on an outer circumferential side of the wheel turning shaft and shaped into a spiral groove, and a nut disposed to surround the wheel turning shaft and to be rotatable relative to the wheel turning shaft. The nut has a rotational axis. The nut has one end side and an opposite end side in a direction along the rotational axis. The ball screw mechanism further includes a nut-side ball screw groove formed on an inner circumferential side of the nut. The nut-side ball screw groove is shaped into a spiral groove, and defines a ball circulation groove together with the wheel turning shaft-side ball screw groove. The ball screw mechanism further includes a plurality of balls disposed in the ball circulation groove, a circulation member (tube) disposed on an outer side of the nut in a radial direction relative to the rotational axis and configured to connect one end side and an opposite end side of the ball circulation groove so that the plurality of balls can circulate from the one end side to the opposite end side of the ball circulation groove, a housing formed to contain at least the one end side of the nut relative to the circulation member in the direction along the rotational axis, and a bearing disposed on the one end side relative to the circulation member in the direction along the rotational axis between the nut and the housing. The bearing is formed to surround the nut, and rotatably support the nut in the housing. The ball screw mechanism further includes a fixation member formed to at least partially surround the wheel turning shaft and provided with an abutment surface in abutment with an end surface of the bearing on one side in the direction along the rotational axis. The fixation member is configured to fix the bearing to the housing by being fixed in the housing with the abutment surface in abutment with the end surface of the bearing on the one side in the direction along the rotational axis. The fixation member is provided around the nut by being moved from the opposite end side to the one end side of the nut in the direction along the rotational axis at the time of assembling. The plurality of balls moves in the ball circulation groove according to a rotation of the nut relative to the wheel turning shaft, thereby causing the wheel turning shaft to move relative to the nut in the longitudinal direction of the wheel turning shaft. The electric motor is arranged to provide a rotational force to the nut so that the nut rotates relative to the wheel turning shaft. The fixation member is arcuately formed to have a cutout portion opened over a predetermined range in the circumferential direction of the fixation member. The cutout portion is formed to prevent the fixation member from interfering with the circulation member when the fixation member is inserted in the housing. The abutment surface is formed over a circumferential range except for the cutout portion.

The fixation member is formed in such a manner that the cutout portion overlaps the abutment surface in the radial direction, whereby it is possible to reduce the size of the fixation member while securing a sufficient width of the abutment surface in the radial direction, compared to a fixation member having an inner diameter set according to a largest diameter of the circulation member. Although the area of the abutment surface reduces at a portion where the cutout portion is formed, a sufficient fixation force can be maintained at a portion of the abutment surface other than the cutout portion.

In the above-described power steering apparatus, the circulation member may be mounted in such a manner that a longitudinal direction of the circulation member extends obliquely relative to the rotational axis of the nut. Further, the circulation member may be formed in such a manner that a width of the circulation member in the direction perpendicular to the longitudinal direction of the circulation member is narrower than a circumferential width of the cutout portion. The cutout portion may be formed in such a manner that the circumferential width of the cutout portion is narrower than a circumferential width of the circulation member when the circulation member is mounted on the nut.

Forming the fixation member in the above-described manner can reduce the circumferential width of the cutout portion to thereby secure a sufficient area in abutment with the bearing. When the fixation member is mounted, the fixation member is provided around the nut while tilting the fixation member along the longitudinal direction of the circulation member, thereby preventing the fixation member from interfering with the circulation member.

In the above-described power steering apparatus, the housing may include an engagement groove provided on an inner circumferential side thereof and formed to circumferentially extend. The fixation member may be made from an elastic material so as to be provided around the nut in a compressed state and then be engaged with the engagement groove in an extended state from the compressed state, thereby fixing the bearing to the housing.

The employment of the fixation member configured to be engaged with the engagement groove by an elastic force such as a C-ring or a snap ring can facilitate the work to fix the bearing by the fixation member.

According to still another aspect of the present invention, a reduction mechanism, which is disposed between an electric motor and a wheel turning shaft, and designed to be used with a power steering apparatus configured to generate a steering assist force by transmitting a rotational force of the electric motor to the wheel turning shaft, comprises a wheel turning shaft-side ball screw groove formed on an outer circumferential side of the wheel turning shaft and shaped into a spiral groove, and a nut disposed to surround the wheel turning shaft and to be rotatable relative to the wheel turning shaft. The nut has a rotational axis. The nut has one end side and an opposite end side in a direction along the rotational axis. The reduction mechanism further includes a nut-side ball screw groove formed on an inner circumferential side of the nut. The nut-side ball screw groove is shaped into a spiral groove, and defines a ball circulation groove together with the wheel turning shaft-side ball screw groove. The reduction mechanism further includes a plurality of balls disposed in the ball circulation groove, a circulation member (tube) disposed on an outer side of the nut in a radial direction relative to the rotational axis and configured to connect one end side and an opposite end side of the ball circulation groove so that the plurality of balls can circulate from the one end side to the opposite end side of the ball circulation groove, a housing formed to contain at least the one end side of the nut relative to the circulation member in the direction along the rotational axis, and a bearing disposed on the one end side relative to the circulation member in the direction along the rotational axis between the nut and the housing. The bearing is formed to surround the nut, and rotatably supports the nut in the housing. The reduction mechanism further includes a circular fixation member formed to surround the wheel turning shaft and provided with an abutment surface in abutment with an end surface of the bearing on one side in the direction along the rotational axis. The fixation member is configured to fix the bearing to the housing by being fixed in the housing with the abutment surface in abutment with the end surface of the bearing on the one side in the direction along the rotational axis. The fixation member is provided around the nut by being moved from the opposite end side to the one end side of the nut in the direction along the rotational axis at the time of assembling. The plurality of balls moves in the ball circulation groove according to a rotation of the nut relative to the wheel turning shaft, thereby causing the wheel turning shaft to move relative to the nut in the longitudinal direction of the wheel turning shaft. The abutment surface of the fixation member is formed on at least an inner side of the fixation member in the radial direction. The fixation member includes a cutout portion provided on the inner side of the fixation member in the radial direction, and formed to prevent the fixation member from interfering with the circulation member when the fixation member is inserted in the housing. The cutout portion is formed in such a manner that a distance from the rotational axis of the nut to an inner end of the cutout portion in the radial direction is longer than a distance from the rotational axis of the nut to an inner end of the abutment surface in the radial direction.

The fixation member is formed in such a manner that the cutout portion overlaps the abutment surface in the radial direction, whereby it is possible to reduce the size of the fixation member while securing a sufficient width of the abutment surface in the radial direction, compared to a fixation member having an inner diameter set according to a largest diameter of the circulation member. Although the area of the abutment surface reduces at a portion where the cutout portion is formed, a sufficient fixation force can be maintained at a portion of the abutment surface other than the cutout portion.

In the above-described reduction mechanism for the power steering apparatus, the housing may include a female screw portion formed on an inner circumferential side thereof. The fixation member may include a male screw portion formed on an outer circumferential side thereof and configured to be threadably engaged with the female screw portion of the housing. A distance from the rotational axis of the nut to an inner circumferential surface of the fixation member may be an inner diameter of the fixation member. A distance between a farthest position of the circulation member from the rotational axis of the nut and the rotational axis of the nut may be a largest outer diameter of the circulation member. One end side of the fixation member in the direction along the rotational axis may be formed in such a manner that the inner diameter of the one end side of the fixation member in the direction along the rotational axis is smaller than the largest outer diameter of the circulation member. An opposite end side of the fixation member in the direction along the rotational axis may be formed in such a manner that the inner diameter of the opposite end side of the fixation member in the direction along the rotational axis is larger than the largest outer diameter of the circulation member so as to prevent the fixation member from interfering with the circulation member.

The reduction in the inner diameter of the fixation member on the one end side in the direction along the rotational axis leads to a reduction in the diameter of the abutment surface in abutment with the bearing, thereby securing a sufficient abutment area without increasing the size of the bearing. On the other hand, the increase in the inner diameter of the fixation member on the opposite end side in the direction along the rotational axis can prevent the fixation member from interfering with the circulation member.

In the above-described reduction mechanism for the power steering apparatus, the circulation member may be mounted in such a manner that a longitudinal direction of the circulation member extends obliquely relative to the rotational axis of the nut. Further, the circulation member may be formed in such a manner that a width of the circulation member in the direction perpendicular to the longitudinal direction of circulation member is narrower than a circumferential width of the cutout portion. The cutout portion may be formed in such a manner that the circumferential width of the cutout portion is narrower than a circumferential width of the circulation member when the circulation member is mounted on the nut.

Forming the fixation member in the above-described manner can reduce the circumferential width of the cutout portion to thereby secure a sufficient area in abutment with the bearing. When the fixation member is mounted, the fixation member is provided around the nut while tilting the fixation member along the longitudinal direction of the circulation member, thereby preventing the fixation member from interfering with the circulation member.

In the above-described reduction mechanism for the power steering apparatus, the housing may include a female screw portion formed on an inner circumferential surface thereof. The fixation member may include a male screw portion formed on an outer circumferential side thereof and configured to be threadably engaged with the female screw portion of the housing, and an engagement groove provided to be opened on an inner circumferential side thereof and configured to be engaged with a tool for threadably engaging the fixation member with the housing.

Forming the engagement groove into concaves opened on the inner circumferential side leads to a reduction in the size of the engagement groove in the radial direction to allow a reduction in the outer diameter of the lock ring, compared to an engagement portion shaped into holes to be engaged with the tool.

In the above-described reduction mechanism for the power steering apparatus, the fixation member may include a plurality of engagement grooves, and the plurality of engagement grooves is substantially equally spaced in a circumferential direction of the fixation member.

A torque can be evenly applied to the engagement grooves.

Still another aspect of the present invention is a fixation member, which is configured to be used with a reduction mechanism for power steering. A bearing of the reduction mechanism is fixed to a housing of the reduction mechanism by the fixation member. The fixation member is circularly formed to surround a wheel turning shaft. The fixation member includes an abutment surface in abutment with an end surface of the bearing on one side in the axial direction of the bearing. The abutment surface of the fixation member is formed on at least an inner side of the fixation member in the radial direction of the fixation member. The fixation member includes a cutout portion provided on the inner side of the fixation member in the radial direction and formed to prevent the fixation member from interfering with a circulation member mounted outside the reduction mechanism when the fixation member is inserted in the housing. The cutout portion is formed in such a manner that a distance from the central axis of the fixation member to an inner end of the cutout portion in the radial direction is longer than a distance from the central axis of the fixation member to an inner end of the abutment surface in the radial direction.

Still another aspect of the present invention is a fixation member, which is configured to be used with a reduction mechanism for power steering. A bearing of the reduction mechanism is fixed to a housing of the reduction mechanism by the fixation member. The fixation member is arcuately formed to at least partially surround the wheel turning shaft. The fixation member includes an abutment surface in abutment with an end surface of the bearing on one side in the axial direction of the fixation member. The fixation member is arcuately formed to have a cutout portion opened over a predetermined range in the circumferential direction of the fixation member. The cutout portion is formed to prevent the fixation member from interfering with the circulation member when the fixation member is inserted in the housing. The abutment surface is formed over a circumferential range except for the cutout portion.

Still another aspect of the present invention is a fixation member, which is configured to be used with a reduction mechanism for power steering. A bearing of the reduction mechanism is fixed to a housing of the reduction mechanism by the fixation member. The fixation member is circularly formed to surround a wheel turning shaft. The fixation member includes an abutment surface in abutment with an end surface of the bearing on one side in the axial direction of the fixation member. The fixation member includes a cutout portion provided on an inner side of the fixation member in the radial direction of the fixation member and formed to prevent the fixation member from interfering with a circulation member mounted outside the reduction mechanism when the fixation member is inserted in the housing. The cutout portion is formed in such a manner that a distance from a central axis of the fixation member to an inner end of the cutout portion in the radial direction is longer than a distance from the central axis of the fixation member to an inner circumferential surface of the fixation member. The cutout portion is formed in such a manner that a circumferential width of the cutout portion is wider than a width of the circulation member in the direction perpendicular to the longitudinal direction of the circulation member.

Having described the present invention based on the first to fourth embodiments, the specific configurations of the inventions are not limited to these embodiments. These embodiments can be modified without departing from the scope of the present invention, and such modifications can be also included in the present invention.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2013-061663 filed on Mar. 25, 2013.

The entire disclosure of Japanese Patent Application No. 2013-061663 filed on Mar. 25, 2013 including specification, claims, drawings and summary are incorporated herein by reference in its entirety.

What is claimed is:

1. A power steering apparatus comprising:
a wheel turning shaft configured to turn a wheel to be steered by being moved in an axial direction of the wheel turning shaft according to a rotation of a steering wheel;
a ball screw mechanism configured to cause the wheel turning shaft to move in the axial direction of the wheel turning shaft; and
an electric motor configured to provide a rotational force to the wheel turning shaft via the ball screw mechanism, wherein the ball screw mechanism includes
- a wheel turning shaft ball screw groove formed on an outer circumferential surface of the wheel turning shaft and shaped into a spiral groove,
- a nut disposed to surround the wheel turning shaft and to be rotatable relative to the wheel turning shaft, the nut having a rotational axis, the nut including one end and an opposite end in a direction of the rotational axis of the nut,
- a nut ball screw groove formed on an inner circumferential surface of the nut and shaped into a spiral groove, the nut ball screw groove being configured to define a ball circulation groove together with the wheel turning shaft ball screw groove,
- a plurality of balls disposed in the ball circulation groove,
- a circulation member disposed on an outer side of the nut in a radial direction relative to the rotational axis of the nut, the circulation member being configured to connect one end and an opposite end of the ball circulation groove so that the plurality of balls can circulate from the one end to the opposite end of the ball circulation groove,
- a housing formed to contain at least one of the ends of the nut which is spaced apart from the circulation member in an axial direction of the nut,
- a bearing disposed on the one end of the nut which is spaced apart from the circulation member in the axial direction of the nut between the nut and the housing and formed to surround the nut, the bearing being configured to rotatably support the nut in the housing, and
- a circular fixation member formed to surround the wheel turning shaft and provided with an abutment surface in abutment with an end surface of the bearing in the axial direction of the nut, the fixation member being configured to fix the bearing to the housing by being fixed in the housing with the abutment surface of the circular fixation member being in abutment with the end surface of the bearing in the axial direction of the nut, the fixation member configured to be provided around the nut by being moved from the opposite end of the nut to the one end of the nut in the axial direction of the nut at a time of assembling the power steering apparatus, wherein the plurality of balls move in the ball circulation groove according to a rotation of the nut relative to the wheel turning shaft, thereby causing the wheel turning shaft to move relative to the nut in the axial direction of the wheel turning shaft, wherein the electric motor is arranged to provide a rotational force to the nut so that the nut rotates relative to the wheel turning shaft, wherein the abutment surface of the fixation member is formed on at least an inner side of the fixation member in a radial direction of the fixation member, wherein the fixation member includes a cutout portion provided on the inner side of the fixation member in the radial direction of the fixation member, and formed to prevent the fixation member from interfering with the circulation member when the fixation member is inserted in the housing, and wherein the cutout portion is formed in such a manner that a distance from the rotational axis of the nut to the cutout portion in the radial direction of the fixation member is longer than a distance from the rotational axis of the nut to the abutment surface in the radial direction of the fixation member.

2. The power steering apparatus according to claim 1, wherein the housing includes a female screw portion formed on an inner circumferential surface thereof,
wherein the fixation member includes a male screw portion formed on an outer circumferential surface thereof and configured to be threadably engaged with the female screw portion of the housing, and the fixation member further includes an engagement groove configured to be engaged with a tool for threadably engaging the fixation member with the housing.

3. The power steering apparatus according to claim 2, wherein the fixation member includes a plurality of engagement grooves, and the plurality of engagement grooves are substantially equally spaced in a circumferential direction of the fixation member.

4. The power steering apparatus according to claim 2, wherein the cutout portion includes one circumferential end and an opposite circumferential end, and the one circumferential end is configured to abut against the tool to transmit a rotational torque of the tool to the fixation member.

5. The power steering apparatus according to claim 1, wherein the housing includes a female screw portion formed on an inner circumferential surface thereof,
wherein the fixation member includes a male screw portion formed on an outer circumferential surface thereof and configured to be threadably engaged with the female screw portion of the housing,
wherein a distance from the rotational axis of the nut to an inner circumferential surface of the fixation member is an inner radius of the fixation member,
wherein a distance between a farthest point on the circulation member from the rotational axis of the nut and the rotational axis of the nut is a largest outer radius of the circulation member,
wherein one end of the fixation member in the axial direction of the nut is formed in such a manner that an inner radius of the one end of the fixation member is smaller than the largest outer radius of the circulation member, and
wherein an opposite end of the fixation member in the axial direction of the nut is formed in such a manner that an inner radius of the opposite end of the fixation member is larger than the largest outer radius of the circulation member so as to prevent the fixation member from interfering with the circulation member.

6. The power steering apparatus according to claim 1, wherein the circulation member is mounted on the nut in such a manner that a longitudinal direction of the circulation member extends obliquely relative to the rotational axis of the nut,
wherein the circulation member is formed in such a manner that a width of the circulation member in a direction perpendicular to the longitudinal direction of the circulation member is narrower than a circumferential width of the cutout portion, and
wherein the cutout portion is formed in such a manner that the circumferential width of the cutout portion is narrower than a circumferential width of the circulation member when the circulation member is mounted on the nut.

7. A power steering apparatus comprising:
- a wheel turning shaft configured to turn a wheel to be steered by being moved in an axial direction of the wheel turning shaft according to a rotation of a steering wheel;

a ball screw mechanism configured to cause the wheel turning shaft to move in the axial direction of the wheel turning shaft; and
an electric motor configured to provide a rotational force to the wheel turning shaft via the ball screw mechanism,
wherein the ball screw mechanism includes
  a wheel turning shaft ball screw groove formed on an outer circumferential surface of the wheel turning shaft and shaped into a spiral groove,
  a nut disposed to surround the wheel turning shaft and to be rotatable relative to the wheel turning shaft, the nut having a rotational axis, the nut including one end and an opposite end in a direction of the rotational axis of the nut,
  a nut ball screw groove formed on an inner circumferential surface of the nut and shaped into a spiral groove, the nut ball screw groove being configured to define a ball circulation groove together with the wheel turning shaft ball screw groove,
  a plurality of balls disposed in the ball circulation groove,
  a circulation member disposed on an outer side of the nut in a radial direction relative to the rotational axis of the nut, the circulation member being configured to connect one end and an opposite end of the ball circulation groove so that the plurality of balls can circulate from the one end to the opposite end of the ball circulation groove,
  a housing formed to contain at least one of the ends of the nut which is spaced apart from the circulation member in an axial direction of the nut,
  a bearing disposed on the one end of the nut which is spaced apart from the circulation member in the axial direction of the nut between the nut and the housing and formed to surround the nut, the bearing being configured to rotatably support the nut in the housing, and
  a fixation member formed to at least partially surround the wheel turning shaft and provided with an abutment surface in abutment with an end surface of the bearing in the axial direction of the nut, the fixation member being configured to fix the bearing to the housing by being fixed in the housing with the abutment surface of the fixation member being in abutment with the end surface of the bearing in the axial direction of the nut, the fixation member configured to be provided around the nut by being moved from the opposite end of the nut to the one end of the nut in the axial direction of the nut at a time of assembling the power steering apparatus,
wherein the plurality of balls move in the ball circulation groove according to a rotation of the nut relative to the wheel turning shaft, thereby causing the wheel turning shaft to move relative to the nut in the axial direction of the wheel turning shaft,
wherein the electric motor is arranged to provide a rotational force to the nut so that the nut rotates relative to the wheel turning shaft,
wherein the fixation member is arcuately formed to have a cutout portion opened over a predetermined range in a circumferential direction of the fixation member,
wherein the cutout portion is formed to prevent the fixation member from interfering with the circulation member when the fixation member is inserted in the housing, and
wherein the abutment surface is formed over a circumferential range except for the cutout portion.

8. The power steering apparatus according to claim 7, wherein the circulation member is mounted on the nut in such a manner that a longitudinal direction of the circulation member extends obliquely relative to the rotational axis of the nut,
  wherein the circulation member is formed in such a manner that a width of the circulation member in a direction perpendicular to the longitudinal direction of the circulation member is narrower than a circumferential width of the cutout portion, and
  wherein the cutout portion is formed in such a manner that the circumferential width of the cutout portion is narrower than a circumferential width of the circulation member when the circulation member is mounted on the nut.

9. The power steering apparatus according to claim 7, wherein the housing includes an engagement groove provided on an inner circumferential side thereof and formed to circumferentially extend,
  wherein the fixation member is made from an elastic material to be provided around the nut in a compressed state and then be engaged with the engagement groove in an extended state from the compressed state, thereby fixing the bearing to the housing.

10. A reduction mechanism disposed between an electric motor and a wheel turning shaft, and designed to be used with a power steering apparatus configured to generate a steering assist force by transmitting a rotational force of the electric motor to the wheel turning shaft, the reduction mechanism comprising:
  a wheel turning shaft ball screw groove formed on an outer circumferential surface of the wheel turning shaft and shaped into a spiral groove;
  a nut disposed to surround the wheel turning shaft and to be rotatable relative to the wheel turning shaft, the nut having a rotational axis, the nut including one end and an opposite end in a direction of the rotational axis of the nut;
  a nut ball screw groove formed on an inner circumferential surface of the nut and shaped into a spiral groove, the nut ball screw groove being configured to define a ball circulation groove together with the wheel turning shaft ball screw groove;
  a plurality of balls disposed in the ball circulation groove;
  a circulation member disposed on an outer side of the nut in a radial direction relative to the rotational axis of the nut, the circulation member being configured to connect one end and an opposite end of the ball circulation groove so that the plurality of balls can circulate from the one end to the opposite end of the ball circulation groove;
  a housing formed to contain at least one of the ends of the nut which is spaced apart from the circulation member in an axial direction of the nut;
  a bearing disposed on the one end of the nut which is spaced apart from the circulation member in the axial direction of the nut between the nut and the housing and formed to surround the nut, the bearing being configured to rotatably support the nut in the housing; and
  a circular fixation member formed to surround the wheel turning shaft and provided with an abutment surface in abutment with an end surface of the bearing in the axial direction of the nut, the fixation member being configured to fix the bearing to the housing by being fixed in the housing with the abutment surface of the fixation member being in abutment with the end surface of the bearing in the axial direction of the nut, the fixation member configured to be provided around the nut by being moved from the opposite end of the nut to the one end of the nut in the axial direction of the nut at a time of assembling the reduction mechanism, wherein the plurality of balls move in the ball circulation groove according to a rotation of the nut relative to the wheel turning shaft, thereby causing the wheel turning shaft to move relative to the nut in an axial direction of the wheel turning shaft, wherein the abutment surface of the fixation member is formed on at least an inner side of the fixation member in a radial direction of the fixation member, wherein the fixation member includes a cutout portion provided on the inner side of the fixation member in the radial direction of the fixation member, and formed to prevent the fixation member from interfering with the circulation member when the fixation member is inserted in the housing, and wherein the cutout portion is formed in such a manner that a distance from the rotational axis of the nut to the cutout portion in the radial direction of the fixation member is longer than a distance from the rotational axis of the nut to the abutment surface in the radial direction of the fixation member.

11. The reduction mechanism for the power steering apparatus according to claim 10, wherein the housing includes a female screw portion formed on an inner circumferential surface thereof, wherein the fixation member includes a male screw portion formed on an outer circumferential surface thereof and configured to be threadably engaged with the female screw portion of the housing, wherein a distance from the rotational axis of the nut to an inner circumferential surface of the fixation member is an inner radius of the fixation member, wherein a distance between a farthest point on the circulation member from the rotational axis of the nut and the rotational axis of the nut is a largest outer radius of the circulation member, wherein one end of the fixation member in the axial direction of the nut is formed in such a manner that an inner radius of the one end of the fixation member is smaller than the largest outer radius of the circulation member, and wherein an opposite end of the fixation member in the axial direction of the nut is formed in such a manner that an inner radius of the opposite end of the fixation member is larger than the largest outer radius of the circulation member so as to prevent the fixation member from interfering with the circulation member.

12. The reduction mechanism for the power steering apparatus according to claim 10, wherein the circulation member is mounted on the nut in such a manner that a longitudinal direction of the circulation member extends obliquely relative to the rotational axis of the nut, wherein the circulation member is formed in such a manner that a width of the circulation member in a direction perpendicular to the longitudinal direction of the circulation member is narrower than a circumferential width of the cutout portion, and wherein the cutout portion is formed in such a manner that the circumferential width of the cutout portion is narrower than a circumferential width of the circulation member when the circulation member is mounted on the nut.

13. The reduction mechanism for the power steering apparatus according to claim 10, wherein the housing includes a female screw portion formed on an inner circumferential surface thereof, wherein the fixation member includes a male screw portion formed on an outer circumferential surface thereof and configured to be threadably engaged with the female screw portion of the housing, and the fixation member further includes an engagement groove configured to be engaged with a tool for threadably engaging the fixation member with the housing.

14. The reduction mechanism for the power steering apparatus according to claim 10, wherein the fixation member includes a plurality of engagement grooves, and the plurality of engagement grooves are substantially equally spaced in a circumferential direction of the fixation member.

* * * * *